(12) United States Patent
Kono et al.

(10) Patent No.: US 9,733,990 B2
(45) Date of Patent: Aug. 15, 2017

(54) INFORMATION PROCESSING SYSTEM AND PROGRAM MIGRATION METHOD

(71) Applicant: FUJITSU LIMITED, Kawasaki-shi, Kanagawa (JP)

(72) Inventors: Taki Kono, Kodaira (JP); Yoshiaki Kurihara, Kawasaki (JP); Kanami Hitsuda, Yokohama (JP); Hiroshi Furukawa, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/827,398

(22) Filed: Aug. 17, 2015

(65) Prior Publication Data

US 2015/0355952 A1 Dec. 10, 2015

Related U.S. Application Data

(63) Continuation of application No. PCT/JP2013/059566, filed on Mar. 29, 2013.

(51) Int. Cl.
  *G06F 9/46* (2006.01)
  *G06F 9/52* (2006.01)
  *G06F 9/48* (2006.01)
  *G06F 9/455* (2006.01)

(52) U.S. Cl.
  CPC .............. *G06F 9/52* (2013.01); *G06F 9/4856* (2013.01); *G06F 9/455* (2013.01)

(58) Field of Classification Search
  None
  See application file for complete search history.

(56) References Cited

U.S. PATENT DOCUMENTS

| 2002/0032718 A1* | 3/2002 | Yates | ................... G06F 9/4426 718/107 |
|---|---|---|---|
| 2003/0101334 A1 | 5/2003 | Desoli | |
| 2007/0226714 A1 | 9/2007 | Doi | |

(Continued)

FOREIGN PATENT DOCUMENTS

| EP | 0543610 | 5/1993 |
|---|---|---|
| EP | 1316882 | 6/2003 |

(Continued)

OTHER PUBLICATIONS

International Search Report and Written Opinion of the International Searching Authority (Form PCT/ISA/210, Form PCT/ISA/237), mailed in connection with PCT/JP2013/059566 and mailed May 7, 2013, with English translation (11 pages).

(Continued)

*Primary Examiner* — Kenneth Tang
(74) *Attorney, Agent, or Firm* — Fujitsu Patent Center

(57) ABSTRACT

A first executing unit executes a first program by emulating information processing in a first operational environment in which the first program is executable. A generating unit generates, in parallel with the execution of the first program, a second program which is executable in a second operational environment of an information processing system and which is capable of acquiring the same processing result as the first program. A second executing unit terminates the execution of the first program by the first executing unit and also executing the second program, after the generation of the second program is completed.

9 Claims, 20 Drawing Sheets

(56) References Cited

U.S. PATENT DOCUMENTS

| | | |
|---|---|---|
| 2009/0193244 A1 | 7/2009 | Oigawa et al. |
| 2012/0011519 A1 | 1/2012 | Ganesh |
| 2012/0130702 A1 | 5/2012 | Citron et al. |
| 2012/0254355 A1 | 10/2012 | Kihara |
| 2012/0296626 A1 | 11/2012 | Bond et al. |
| 2013/0080744 A1 | 3/2013 | Beale |
| 2014/0129808 A1* | 5/2014 | Naveh .................. G06F 9/4856 712/225 |
| 2014/0181830 A1* | 6/2014 | Naik ....................... G06F 9/461 718/104 |
| 2015/0301848 A1* | 10/2015 | Roehrig ............. G06F 9/45508 718/1 |

FOREIGN PATENT DOCUMENTS

| | | |
|---|---|---|
| EP | 1635258 | 3/2006 |
| GB | 2395316 A | 5/2004 |
| JP | 01-309125 | 12/1989 |
| JP | 05-151003 | 6/1993 |
| JP | 05-224995 | 9/1993 |
| JP | 2000-231494 | 8/2000 |
| JP | 2001-067214 | 3/2001 |
| JP | 2003-511790 | 3/2003 |
| JP | 2003-196107 | 7/2003 |
| JP | 2004-157642 | 6/2004 |
| JP | 2004-355277 | 12/2004 |
| JP | 2007-249736 | 9/2007 |
| JP | 2008-537245 | 9/2008 |
| JP | 2009-169450 | 7/2009 |
| JP | 2010-140233 | 6/2010 |
| JP | 2012-108904 | 6/2012 |
| JP | 2012-216091 | 11/2012 |
| WO | 01/27751 | 4/2001 |
| WO | 2006/111705 | 10/2006 |
| WO | 2014087268 A1 | 6/2014 |

OTHER PUBLICATIONS

Extended European Search Report dated Feb. 29, 2016 for corresponding European Patent Application No. 13880068.5, 8 pages.
Japanese Office Action mailed Jul. 12, 2016 for corresponding Japanese Application No. 2015-507877, with Partial English Translation, 9 pages.
Japanese Office Action mailed Feb. 7, 2017 for corresponding Japanese Patent Application No. 2015-507877, with English Translation, 11 pages.

* cited by examiner

141 CHECKPOINT INFORMATION

| CHECK-POINT NUMBER | EMULATOR ENVIRONMENT | | NATIVE ENVIRONMENT | | CONVERSION ALGORITHM | SNAPSHOT ACQUI-SITION | NUMBER OF EXECUTION TIMES |
|---|---|---|---|---|---|---|---|
| | LEADING ADDRESS | SIZE | LEADING ADDRESS | SIZE | | | |
| 1 | 0x10000000 | 16byte | 0x10000000 | 32byte | AL1 | 9:00 | 100 |
| | 0x10000010 | 8byte | 0x10000020 | 16byte | AL2 | | |
| | 0x10000018 | 24byte | 0x10000030 | 32byte | AL1 | | |
| 2 | 0x10000000 | 10byte | 0x10000000 | 15byte | AL2 | | 10 |
| : | : | : | : | : | : | : | |
| 1000 | 0x10010000 | 16byte | 0x10020000 | 24byte | AL2 | | 2000 |
| | 0x10010010 | 24byte | 0x10020018 | 32byte | AL2 | | |
| | 0x10010028 | 8byte | 0x10020038 | 16byte | AL3 | | |
| : | : | : | : | : | : | : | |
| 10000 | 0x10010000 | 16byte | 0x10020000 | 24byte | AL2 | 9:30 | 10 |
| | 0x10010010 | 24byte | 0x10020018 | 32byte | AL2 | | |
| | 0x10010028 | 8byte | 0x10020038 | 16byte | AL3 | | |
| : | : | : | : | : | : | : | |

FIG. 7

INFORMATION PROCESSING SYSTEM AND PROGRAM MIGRATION METHOD

CROSS-REFERENCE TO RELATED APPLICATION

This application is a continuation application of International Application PCT/JP2013/059566 filed on Mar. 29, 2013 which designated the U.S., the entire contents of which are incorporated herein by reference.

FIELD

The embodiments discussed herein relate to an information processing system and a program migration method for converting a code of an execution program.

BACKGROUND

In a computer system, migration of a program may be performed. Migration of a program refers to making a program being executed on a certain computer executable on another computer. For example, when a computer executing a program has insufficient hardware performance, the program is migrated to a computer with a higher performance. In addition, when a cloud system is caused to execute a program having been executed on a computer installed locally, the program is also migrated to a computer in the cloud system.

A program has an operational environment specified to allow normal execution of the program. When the platform of the migration destination computer is not adapted to the operational environment specified in the program, the program may be migrated by installing the program in the migration destination computer. The platform refers to hardware resources and software resources such as the CPU (Central Processing Unit) and the OS (Operating System) which serve as the operational basis of the program. The type of CPU or OS of the platform, for example, is specified as a program's operating environment. The type of the CPU or OS is determined, for example, by the design concept (architecture) applied thereto.

When a program is migrated, there may be a case where the platform of the migration destination computer is not adapted to the operational environment specified in the program. In such a case, it is conceivable to recompile the program to be migrated provided that there exists the source code of the program, for example. The program may be migrated by installing, in the migration destination computer, the program acquired by recompilation from the source code for the migration destination computer.

On the other hand, there may exist a program whose source code is not available. When the source code is not available, binary conversion of the program is performed, for example. Binary conversion converts the binary code described in the program into a binary code adapted to the platform of the migration destination computer. A program may be migrated by installing the binary converted program in the migration destination computer.

In addition, it is also possible to migrate a program using an emulator, for example. An emulator is a tool which emulates, on a certain computer, the operational environment provided on another computer, allowing execution of a program for the emulated computer. When migrating a program using an emulator, the emulator emulates, on the migration destination computer, the operational environment provided on the migration source computer. The migration destination computer is caused to execute the program to be migrated via the emulator. There is, for example, a technique of emulating the BIOS operation by a BIOS (Basic Input/OutPut System) emulator, as a technique using an emulator.

See, for example, Japanese Laid-open Patent Publication No. 2009-169450.

With the conventional technique, however, it is difficult to balance between an early execution start of a program on the migration destination computer and an efficient execution of the program after the migration process is completed, when a program is migrated to a computer having a different platform.

For example, migration of a program by re-compilation or binary conversion allows efficient processing by the program whose binary code has been adapted to the platform of the migration destination computer after the migration process is completed. On the other hand, the program is not executable on the migration destination computer until re-compilation or binary conversion is successfully completed, which may delay the start of the execution of the program on the migration destination computer.

In addition, migration of a program using an emulator allows an early execution start of the program on the migration destination computer. On the other hand, the emulator is still operating after the migration of the program is completed, which makes the execution of the program inefficient as long as the emulator is operating after the migration of the program is completed. Inefficient execution of the program may cause decreased use efficiency of computer resources or lower processing speed.

SUMMARY

In one aspect, there is provided a non-transitory computer-readable storage medium storing a computer program that causes a computer to perform a process including: executing a first program by emulating information processing in a first operational environment in which the first program is executable; generating, in parallel with the execution of the first program, a second program which is executable in a second operational environment of the computer and which is capable of acquiring the same processing result as the first program; and terminating the execution of the first program and also executing the second program, after the generation of the second program is completed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an exemplary data structure of checkpoint information;

DESCRIPTION OF EMBODIMENTS

Figure 1:
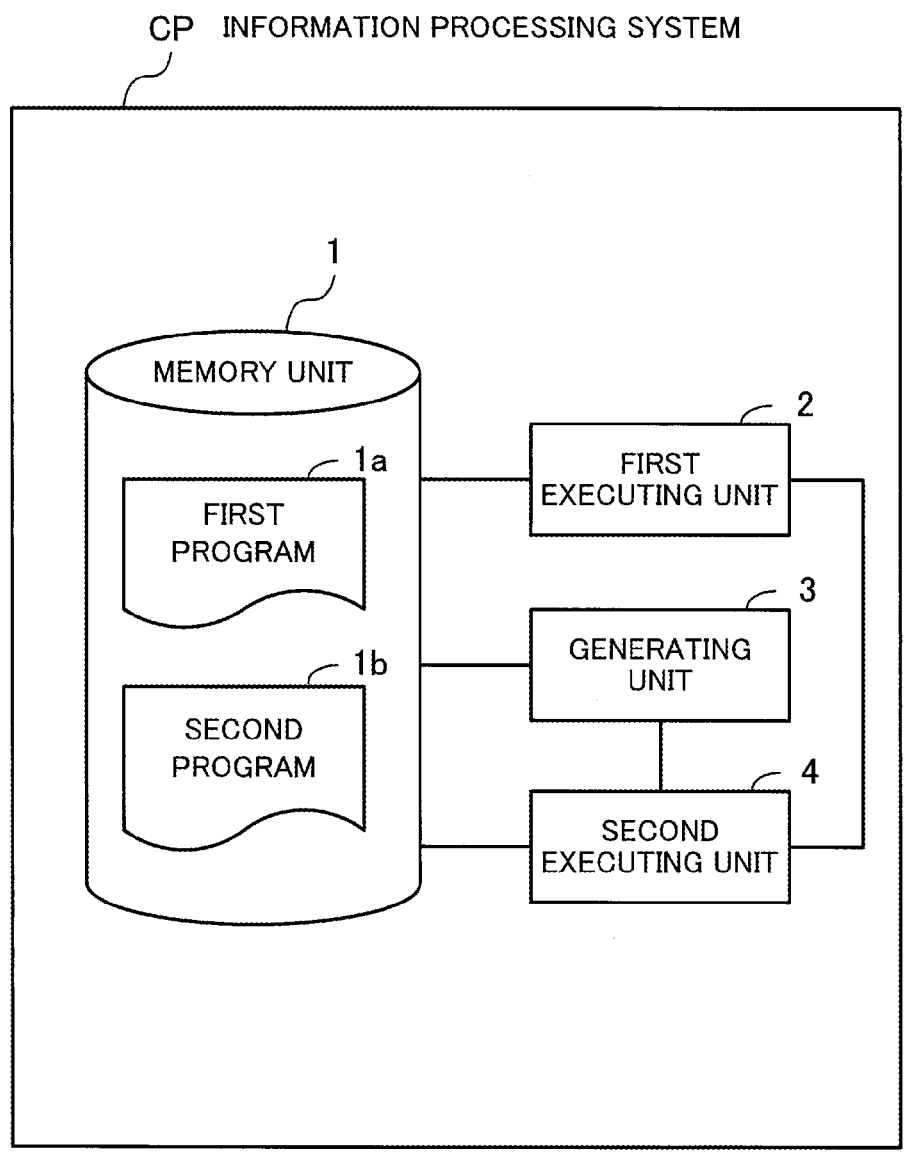
FIG. 1 illustrates an exemplary functional configuration of an information processing system according to a first embodiment.

In the following, the embodiments will be described, referring to the drawings. Each embodiment may be implemented as a combination of a plurality of embodiments within a consistent range.

First Embodiment

First, a first embodiment will be described.

FIG. 1 illustrates an exemplary functional configuration of an information processing system according to the first embodiment. An information processing system CP has a memory unit 1, a first executing unit 2, a generating unit 3, and a second executing unit 4. The information processing system CP is implemented by one or more computers, for example.

The memory unit 1 stores a first program 1a and a second program 1b. The first program 1a is a program executable in a first operational environment. For example, the first program 1a is written with a code which is directly interpretable by a computer having a platform providing the first operational environment. The platform of the information processing system CP provides a second operational environment which is different from the first operational environment. The second program 1b is a program executable in the second operational environment.

The first executing unit 2 operates in the second operational environment provided in the information processing system CP, and emulates the information processing in the first operational environment. The first executing unit 2 then executes the first program 1a in the emulated first operational environment.

The generating unit 3 generates the second program 1b, in parallel with the execution of the first program 1a by the first executing unit 2. The second program 1b is a program executable in the second operational environment and which is capable of acquiring the same processing result as the first program 1a. The generating unit 3 converts, for example, a binary code described in the first program 1a into a binary code executable in the second operational environment.

After the generation of the second program 1b is completed, the second executing unit 4 terminates execution of the first program 1a by the first executing unit 2, and also executes the second program 1b in the second operational environment.

According to the information processing system CP as described above, it is possible to early start execution of the first program 1a in migration of the first program 1a to the information processing system CP, and also to efficiently execute the second program 1b after the migration process is completed.

Figure 2:
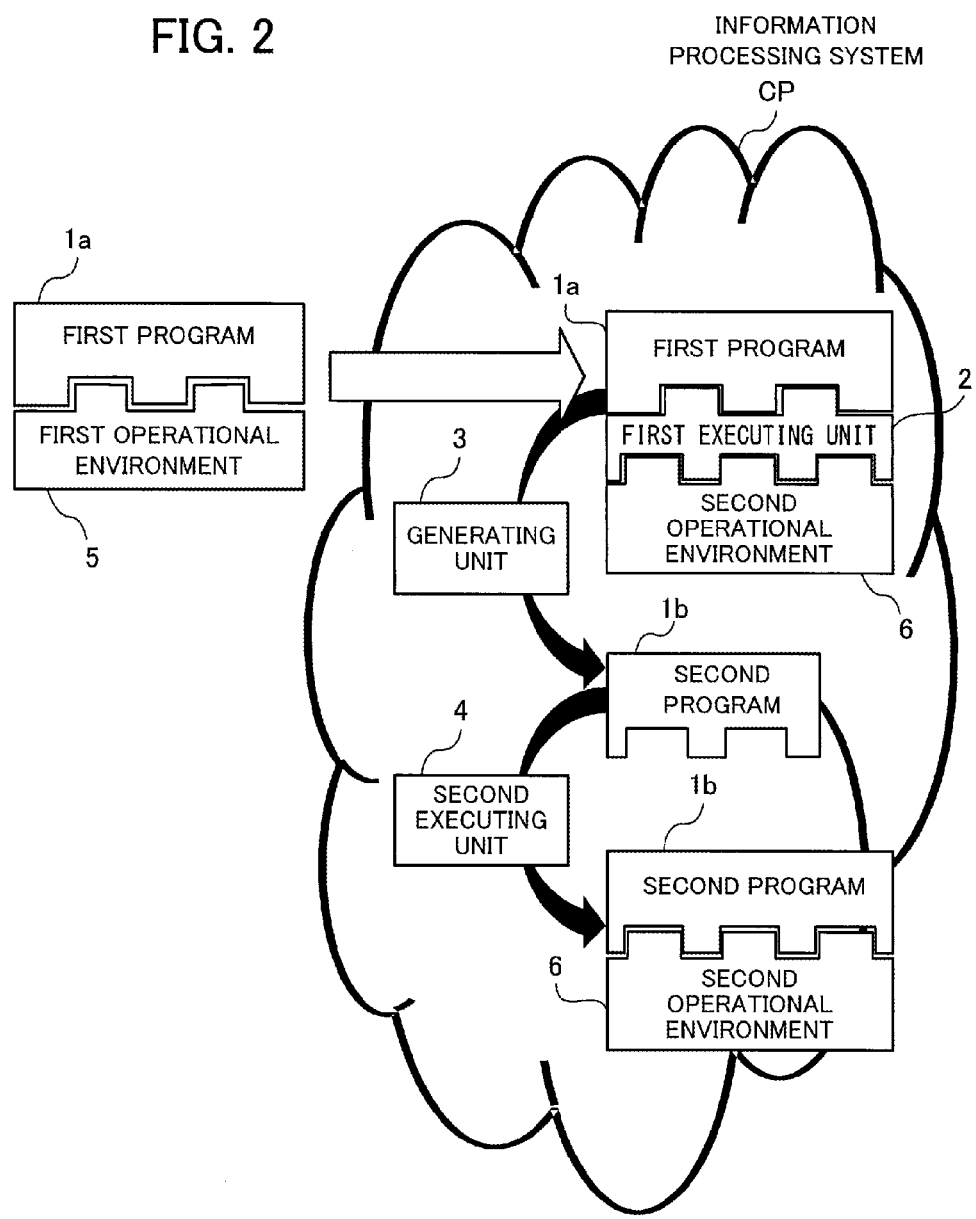
FIG. 2 illustrates an exemplary program migration process in the first embodiment.

FIG. 2 illustrates an exemplary program migration process in the first embodiment. The first program 1a is, for example, a program having been executed by the computer having the first operational environment 5. When the program 1a is migrated to the information processing system CP according to the first embodiment, execution of the first program 1a is first started by the first executing unit 2 in the information processing system CP. In addition, the second program 1b is generated by the generating unit 3, in parallel with the execution of the first program 1a by the first executing unit 2. The generated second program 1b is stored in the memory unit 1, for example.

When the generation of the second program 1b is completed, the second executing unit 4 instructs the first executing unit 2 to terminate the execution of the first program 1a. Upon receiving the instruction, the first executing unit 2 terminates the execution of the first program 1a. In addition, the second executing unit 4 executes the second program 1b on the second operational environment 6 included in the information processing system CP.

According to the first embodiment as thus described, the information processing system CP allows an early execution start of the first program 1a, and also an efficient execution of the second program 1b after the second program 1b is generated.

The generating unit 3 is capable of generating the second program 1b by, for example, converting the binary code of the first program 1a into a binary code executable in the second operational environment 6. Accordingly, it is possible to generate the second program 1b which is executable in the second operational environment 6 and which is capable of acquiring the same processing result as the first program 1a, even when the source code of the first program 1a is not available, for example. When the source code of the first program 1a is available, the second program 1b may be generated by compiling the source code.

In addition, when the second program 1b does not operate normally, for example, the generating unit 3 may generate, by a generation algorithm which is different from the previous one, a third program which is executable in the second operational environment 6 and which is capable of acquiring the same processing result as the first program 1a. While the third program is being generated, the first program 1a is executed by the first executing unit 2. Accordingly, it is possible to increase the reliability of the program executed after the migration.

In addition, the second executing unit 4 may identify the next code to the last-executed code of the terminated first program 1a, and start the execution of the second program 1b from a code in the second program 1b corresponding to the identified code. Accordingly, no duplicate processing occurs in switching of the executed program, whereby the efficiency of processing may be increased.

In addition, the second executing unit 4 may terminate the first program 1a after having executed the first program 1a and the second program 1b in parallel. Accordingly, the first program 1a may be terminated after confirmation that the second program 1b is executable. As a result, it is possible to prevent occurrence of an idle period during the execution of the first program 1a or the second program 1b due to malfunction of the second program 1b.

In addition, while the first program 1a and the second program 1b are being executed in parallel, the second executing unit 4 may compare the result of processing by the second program 1b with the result of processing by the first program 1a. In such a case, the second executing unit 4 determines, based on the result of comparison, whether or not the information processing based on the second program 1b has been performed normally. Accordingly, it is possible to further increase the reliability of the second program 1b. On this occasion, the second executing unit 4 may terminate the execution of the first program 1a after confirmation that the second program 1b has been normally operating for a predetermined period or longer, for example. Accordingly, it is possible to prevent independent execution of the second program 1b in a low-reliability state.

The first executing unit 2, the generating unit 3, and the second executing unit 4 may be realized by a processor included in the information processing system CP, for example. In addition, the memory unit 1 may be realized by a memory such as a RAM (Random Access Memory) included in the information processing system CP, for example.

In addition, the line interconnecting respective elements illustrated in FIG. 1 indicates a part of the communication path, and communication paths other than the illustrated communication path may also be set.

Second Embodiment

Next, a second embodiment will be described. The second embodiment is configured to migrate a program to a cloud system. In the second embodiment, the program's operating environment is changed from the emulator environment to the native environment according to immediate switching. Immediate switching terminates the execution of the program in the emulator environment, upon completion of the program code conversion, and also starts execution of the program in the native environment.

Here, the emulator environment is a program's operating environment realized by emulating, by the emulator, the information processing operation of another computer. The native environment, in contrast, is a program's operating environment provided by an original function of the computer without via the emulator.

Figure 3:
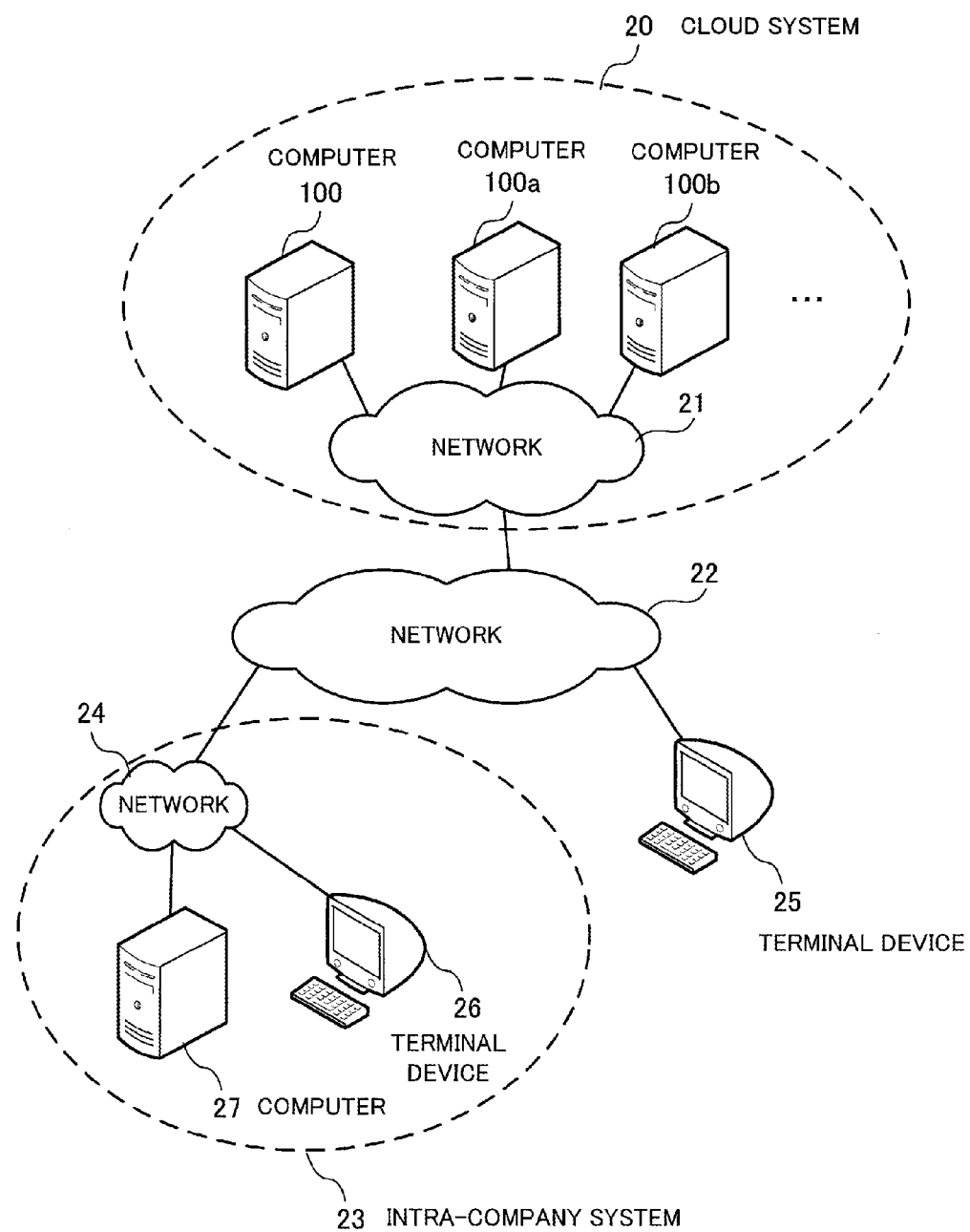
FIG. 3 illustrates an exemplary system configuration of a second embodiment.

FIG. 3 illustrates an exemplary system configuration of the second embodiment. A cloud system 20 has a plurality of computers 100, 100a, 100b, . . . provided therein via a network 21. The network 21 is connected to a wide area network 22, and the plurality of computers 100, 100a, 100b, . . . provides information processing service to many and unspecified users in response to a request received via the wide area network 22. The cloud system 20 is, for example, an IaaS (Infrastructure as a Service) or a PaaS (Platform as a Service) type public cloud. IaaS is a cloud service providing infrastructure such as servers, CPUs, storages, and the like. PaaS is a cloud service providing the basis for executing programs such as application programs.

The wide area network 22 has connected thereto a network 24 and a terminal device 25 of an intra-company system 23, for example. The network 24 of the intra-company system 23 has a terminal device 26 and a computer 27 connected thereto.

In a system as described above, there is a case of migrating a program which has been executed on the computer 27 of the intra-company system 23 to a computer 100 of the cloud system 20, for example. Making available on the cloud system 20 a program having been used by a company on a closed intra-company system may allow the company to reduce the cost and workload relating to possession and maintenance of the computer system. In addition, the cloud system 20 allows the user to use as much system resources as needed at a desired time and be charged on a pay-by-use basis. Using such a service, a company may reduce the cost relating to system operation by reducing the amount of resources used.

There is a case where the operational environment of a closed intra-company system such as the OS or hardware is different from the operational environment of the computer 100 in the cloud system 20. In addition, a long time may have elapsed since the development and start-of-operation of programs which have been used in the company and, as a result, the source code of some of the programs may be missing with only the binary code existing.

In the second embodiment, therefore, an emulator capable of operating a program (e.g., application program) of an existing system (e.g., the computer 27) is provided in the cloud system 20. Furthermore, the binary code of the existing system is transmitted from the computer 27 to the cloud system 20, for example, without modifying or re-compiling the source code of the program. Subsequently, the cloud system 20 performs emulation so as to execute a program with a code adapted to the computer 27.

Furthermore, in the cloud system 20, the binary code of a program is converted in the background so as to be adapted to the architecture of the cloud system 20, in parallel with the execution of the program by emulation. The cloud system 20 then switches, at the timing when the conversion is completed, from execution in the emulator environment to execution in the native environment of the cloud system 20. In order to realize such processing, the computers 100, 100a, 100b, . . . in the cloud system 20 have the following hardware configuration, for example.

Figure 4:
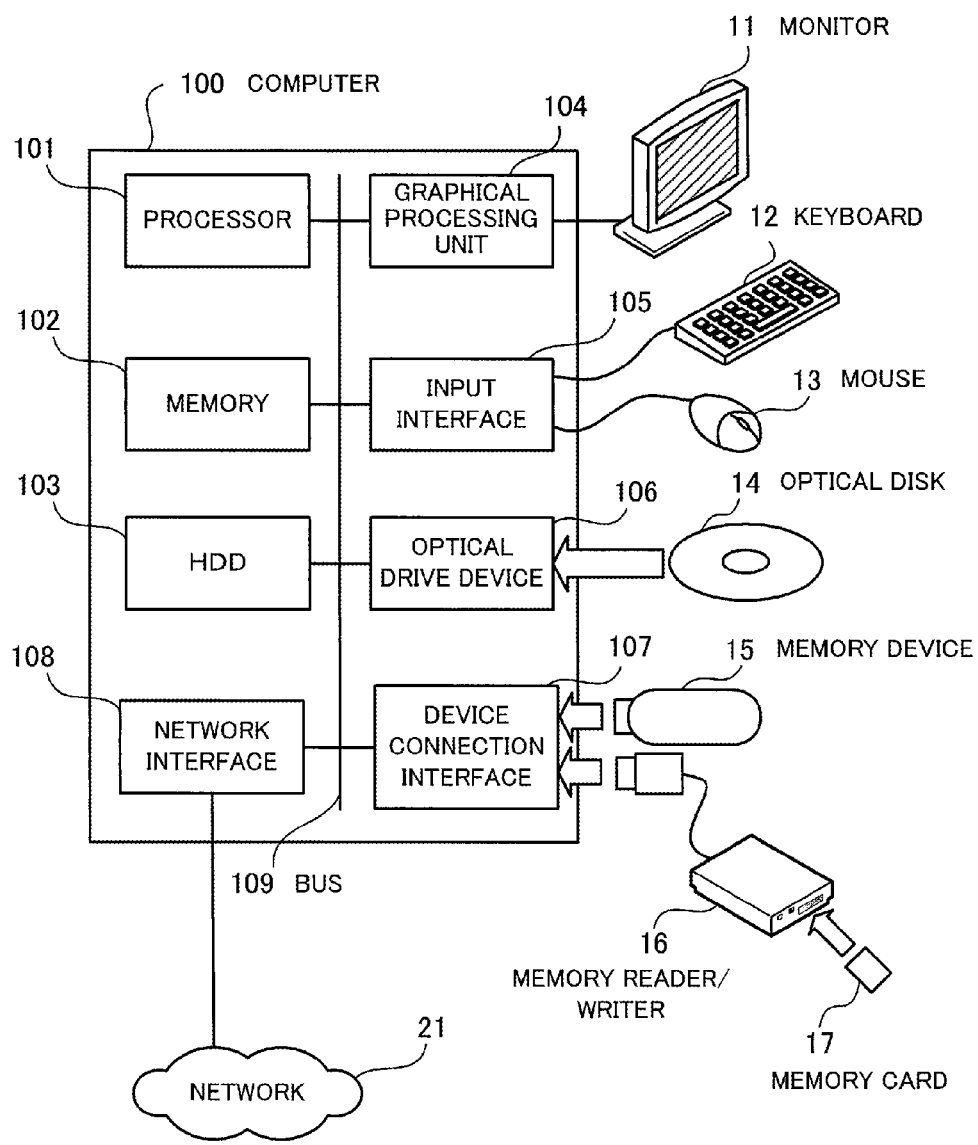
FIG. 4 illustrates an exemplary hardware configuration of a computer used in the embodiment.

FIG. 4 illustrates an exemplary hardware configuration of a computer used in the embodiment. The computer 100 is controlled in its entirety by a processor 101. The processor 101 has a memory 102 and a plurality of peripheral devices connected thereto via a bus 109. The processor 101 may be a multiprocessor. The processor 101 is, for example, a CPU, an MPU (Micro Processing Unit), or a DSP (Digital Signal Processor). At least a part of the function of the processor 101 may be implemented by an electronic circuit such as an ASIC (Application Specific Integrated Circuit), a PLD (Programmable Logic Device), or the like.

The memory 102 is used as the main storage device of the computer 100. The memory 102 temporarily stores at least a part of the OS program or application programs to be executed by the processor 101. In addition, the memory 102 stores various data needed for processing by the processor 101. A RAM, for example, is used as the memory 102.

There are an HDD (Hard Disk Drive) 103, a graphical processing unit 104, an input interface 105, an optical drive device 106, a device connection interface 107, and a network interface 108 as peripheral devices connected to the bus 109.

The HDD 103 magnetically writes and reads data to and from a built-in disk. The HDD 103 is used as an auxiliary storage device of the computer 100. The HDD 103 has the OS program, application programs, and various data stored therein. A semiconductor storage device such as flash memory or the like may also be used as the auxiliary storage device.

The graphical processing unit 104 has a monitor connected thereto. The graphical processing unit 104 displays an image on the screen of the monitor 11 according to an instruction from the processor 101. There may be used, as the monitor 11, a visual display device using a CRT (Cathode Ray Tube), a liquid crystal display device, or the like.

The input interface 105 has a keyboard 12 and a mouse 13 connected thereto. The input interface 105 transmits, to the processor 101, signals which have been sent from the keyboard 12 or the mouse 13. The mouse 13 is an exemplary pointing device and other pointing devices may also be used. There are a touch panel, a tablet, a touchpad, a track ball, and the like as other pointing devices.

The optical drive device 106 reads data stored on the optical disk 14 using laser beam or the like. The optical disk 14 is a portable storage medium having data stored thereon in a readable manner using reflection of light. There is a DVD (Digital Versatile Disc), a DVD-RAM, a CD-ROM (Compact Disc Read Only Memory), a CD-R (Recordable)/RW (ReWritable), or the like, as the optical disk 14.

The device connection interface 107 is a communication interface for connecting peripheral devices to the computer 100. For example, the device connection interface 107 may have a memory device 15 and a memory reader/writer 16 connected thereto. The memory device 15 is a storage medium having installed thereon a communication function with the device connection interface 107. The memory reader/writer 16 is a device configured to write data to, or read data from, a memory card 17. The memory card 17 is a card-shaped storage medium.

The network interface 108 is connected to the network 21. The network interface 108 transmits and receives data to and from other computers or communication devices via the network 21.

According to the hardware configuration as described above, it is possible to realize the processing function of the second embodiment. The information processing system CP illustrated in the first embodiment may also be realized by a hardware configuration similar to that of the computer 100 illustrated in FIG. 4. In addition, other computers 100a, 100b, . . . , 27 illustrated in FIG. 3 may also be realized by a hardware configuration similar to that of the computer 100. However, the architecture of the processor of the computer 27 installed in the intra-company system 23 is different from the architecture of the processor 101 of the computer 100.

For example, the computer 100 implements a processing function of the second embodiment by executing a program stored in a computer-readable storage medium. The program having described therein the content of the processing to be executed by the computer 100 may be stored on various storage media. For example, the program to be executed by the computer 100 may be stored in the HDD 103. The processor 101 loads at least a part of the program in the HDD 103 to the memory 102, and executes the program. In addition, it is also possible to store a program to be executed by the computer 100 on a portable storage medium such as the optical disk 14, the memory device 15, the memory card 17, or the like. The program stored on a portable storage medium becomes executable after having been installed in the HDD 103 by control from the processor 101, for example. Alternatively, the processor 101 may directly read, and execute thereon, the program from the portable storage medium.

Next, a program migration function in the computer 100 of the second embodiment will be described.

Figure 5:
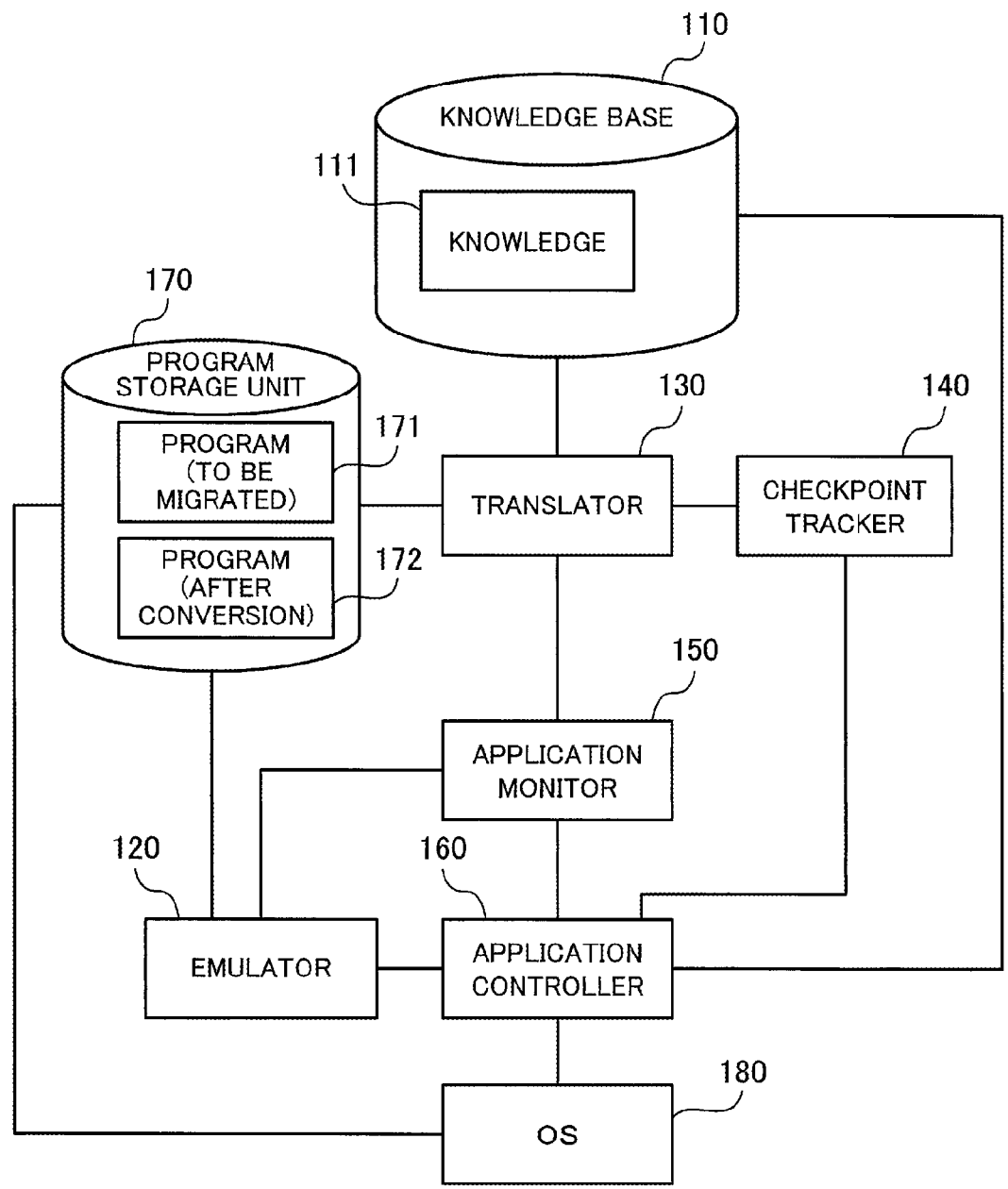
FIG. 5 is a block diagram illustrating a program migration function of the second embodiment.

FIG. 5 is a block diagram illustrating a program migration function of the second embodiment. The computer 100 has a knowledge base 110, an emulator 120, a translator 130, a checkpoint tracker 140, an application monitor 150, an application controller 160, a program storage unit 170, and an OS 180.

The knowledge base 110 stores knowledge 111. The knowledge 111 is knowledge (information) relating to binary translation. The knowledge 111 is prepared for each type of emulator and is used for code conversion of various application programs. For example, a part of the storage area of the memory 102 or the HDD 103 of the computer 100 is used as the knowledge base 110.

The emulator 120 emulates the information processing in an operational environment other than the original operational environment of the computer 100. For example, the emulator 120 emulates the information processing in the operational environment provided by the computer 27 of the intra-company system 23 illustrated in FIG. 3. The emulator 120 is capable of executing a program operable in an operational environment to be emulated by emulating the information processing in the operational environment of another computer.

The translator 130 converts a program executable in the emulator environment into an executable program in the native environment without changing the processing result for the input. For example, the translator 130 converts the binary code of the original program into a binary code using an instruction set defined in the architecture applied to the computer 100. Referring to the knowledge 111, the translator 130 recognizes the conversion algorithm used for converting the binary code.

The checkpoint tracker 140 stores checkpoint information at the time of code conversion. For example, the checkpoint tracker 140 defines checkpoints in an original program (before conversion) 171 and delimits the program with the checkpoints. For example, binary codes delimited at every predetermined numbers may be set as checkpoints. In addition, binary codes including any of one or more instruction codes appearing in the program may be used as checkpoints.

A range in the program delimited by checkpoints is referred to as a checkpoint-divided area. The checkpoint-divided area includes one or more blocks. The block is a binary code string indicating a meaningful process. The checkpoint tracker 140 then stores the content of the conversion of the binary code as checkpoint information for each binary code string delimited by the checkpoints. For example, the checkpoint tracker 140 stores the checkpoint information in the memory 102.

The application monitor 150 monitors the status of code conversion or the execution status of an application. For example, the application monitor 150 monitors the status of program conversion by the translator 130 and determines whether or not the conversion process has been terminated. In addition, the application monitor 150 monitors the execution status of a program generated by code conversion and determines whether or not the processing by the program is normally operating.

When the application monitor 150 detects a change in the status, the application controller 160 switches the program to be executed according to the detected change. For example, the application controller 160 terminates the execution of the original program 171 in the emulator environment upon completion of the code conversion, and starts execution of a converted program 172 in the native environment. In addition, the application controller 160 terminates the execution of the converted program 172 in the native environment upon detecting by the application monitor 150 that the converted program 172 is not normally operating. The application controller 160 then resumes the execution of the original program 171 in the emulator environment.

When the converted program 172 is executed in the native environment, the application controller 160 regularly creates a snapshot of data in the HDD 103 relating to the program 172. The snapshot refers to extraction of a data set in the HDD 103 at a particular time point.

The program storage unit 170 stores the program 171 to be migrated and the program 172 generated by performing code conversion on the program 171. The program 171 to be migrated is input to the computer 100 via another storage medium or a network, for example. The converted program 172 is generated by the translator 130 and stored in the program storage unit 170. A part of the storage area of the memory 102 or the HDD 103, for example, is used as the program storage unit 170.

The OS 180 manages the computer 100 in its entirety. For example, the knowledge base 110, the emulator 120, the translator 130, the checkpoint tracker 140, the application monitor 150, the application controller 160, and the program storage unit 170 are managed by the OS 180. Upon receiving an execution instruction of the converted program 172 from the application controller 160, the OS 180 causes the computer 100 to execute the program 172. For example, the OS 180 causes the computer 100 to execute the program 172 by creating a process of executing the program 172 and assigning the processing time of the processor 101 to the process.

The line interconnecting respective elements illustrated in FIG. 5 indicates a part of the communication path, and there also exist communication paths other than the illustrated communication path. For example, although omitted in FIG. 5, respective elements other than the OS 180 in FIG. 5 are capable of exchanging data or instructions with the OS 180. In addition, although FIG. 5 illustrates the functions of the computer 100, the other computers 100a, 100b, . . . in the cloud system 20 have functions similar to those of the computer 100.

Next, the data structure of the knowledge 111 stored in the knowledge base 110 will be described in detail.

Figure 6:
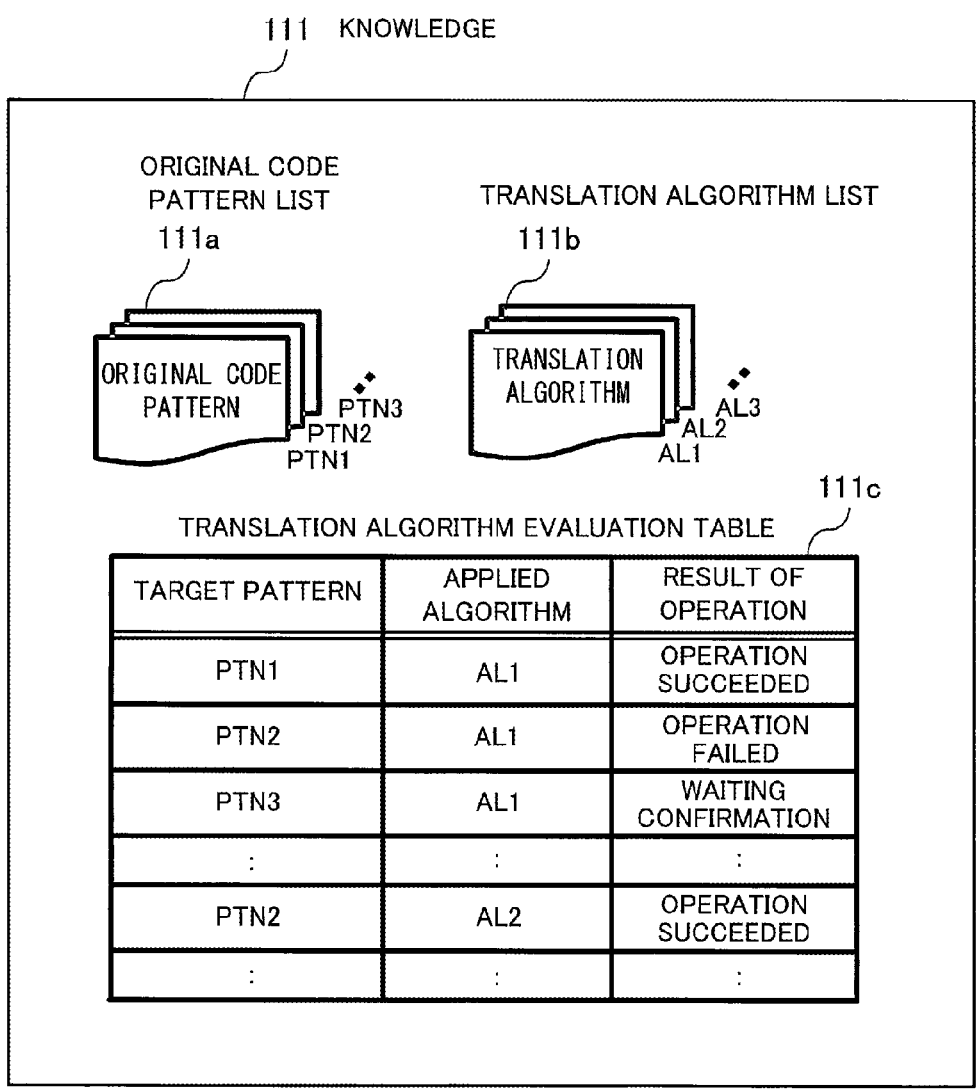
FIG. 6 illustrates an exemplary data structure of knowledge.

FIG. 6 illustrates an exemplary data structure of the knowledge. In the second embodiment, code conversion is performed in terms of blocks in a binary code, for example. In performing code conversion, the binary code is once abstracted using a pattern. Abstraction of the binary code using a pattern refers to changing an implemented binary code to a code description including a plurality of binary code patterns indicating processing of the same type. Processing of the same type refers to, for example, processing to which the same translation algorithm is applicable. An appropriate translation algorithm is then selected for each abstracted pattern, and code conversion is performed according to the translation algorithm. In order to realize such code conversion, the knowledge 111 has an original code pattern list 111a, a translation algorithm list 111b, and a translation algorithm evaluation table 111c.

The original code pattern list 111a has registered therein a plurality of original code patterns each being an abstraction of original codes. The original code patterns respectively have identifiers (PTN1, PTN2, PTN3, . . . ) set therein.

The translation algorithm list 111b has registered therein a plurality of translation algorithms describing the conversion procedure of code conversion. The translation algorithms respectively have identifiers (AL1, AL2, AL3, . . . ) set therein.

The translation algorithm evaluation table 111c has registered therein target patterns, applied algorithms, and operation results of the combinations thereof. The target pattern has registered therein an identifier of a original code pattern with which the binary code to be converted has matched. The applied algorithm has registered therein an identifier of a translation algorithm used for code conversion. The operation result has registered therein whether or not operation of a binary code generated after code conversion has succeeded. For example, when normal operation of the converted binary code has been confirmed, "operation succeeded" is registered as the result of operation. When the operation of the converted binary code has not been confirmed, "waiting confirmation" is registered as the result of operation. When an abnormality has occurred in the operation of the converted binary code, "operation failed" is registered as the result of operation.

When the operation of the converted binary code has resulted in "operation failed", another translation algorithm is selected and reconversion is performed. When the operation of the reconverted binary code succeeds, a translation algorithm which has resulted in "operation succeeded" is selected from the beginning, for the next timing of performing code conversion of a code that matches the same original code pattern.

When the emulator 120 has been modified, the translation algorithm evaluation table 111c is also recreated.

Next, checkpoint information 141 stored in the checkpoint tracker 140 will be described in detail.

FIG. 7 illustrates an exemplary data structure of the checkpoint information. In the example of FIG. 7, the checkpoint information 141 is expressed in the form of a table. The checkpoint information 141 is provided with columns for checkpoint number, emulator environment, native environment, conversion algorithm, snapshot acquisition, and number of execution times.

The checkpoint number column has set therein the identification number of a checkpoint of a conversion source program. Each checkpoint number column has set therein, in terms of blocks, information of the binary code described after the checkpoint indicated by the checkpoint number and before the next checkpoint.

The emulator environment column has set therein the leading address and the size of each block in the conversion source program.

The native environment column has set therein the leading address and the size in the converted program of a block acquired by converting the binary code of the corresponding conversion source block.

The conversion algorithm column has set therein the identifier of the translation algorithm applied to code conversion of a block in the conversion source program.

The snapshot acquisition column has set therein the execution time of a snapshot acquisition process of data in the memory or the HDD, triggered by execution of the binary code in the converted block in the native environment. The snapshot of the memory or the HDD is acquired at a timing of any checkpoint. The time point at which a snapshot has been acquired is real time or system intrinsic time. Any number of generations of snapshots may be stored, for example, which are discarded in chronological order. The storage area in which the discarded snapshot has been stored is released. When a snapshot has been discarded, the acquisition time of the snapshot set by acquisition of the snapshot is deleted from the checkpoint information 141.

The number of execution times column has set therein the number of execution times of the binary code in the converted block corresponding to the checkpoint number. When a checkpoint has been changed by redoing the code conversion or the like, the number of execution times which has been set to the checkpoint number of the previous checkpoint is cleared.

It is thus possible to realize, by the computer 100 as described above, a program migration which requires extra hardware resources only at the time of migration and uses only minimum requisite hardware resources after the completion of the migration, while allowing an early execution start of a program to be migrated.

Figure 8:
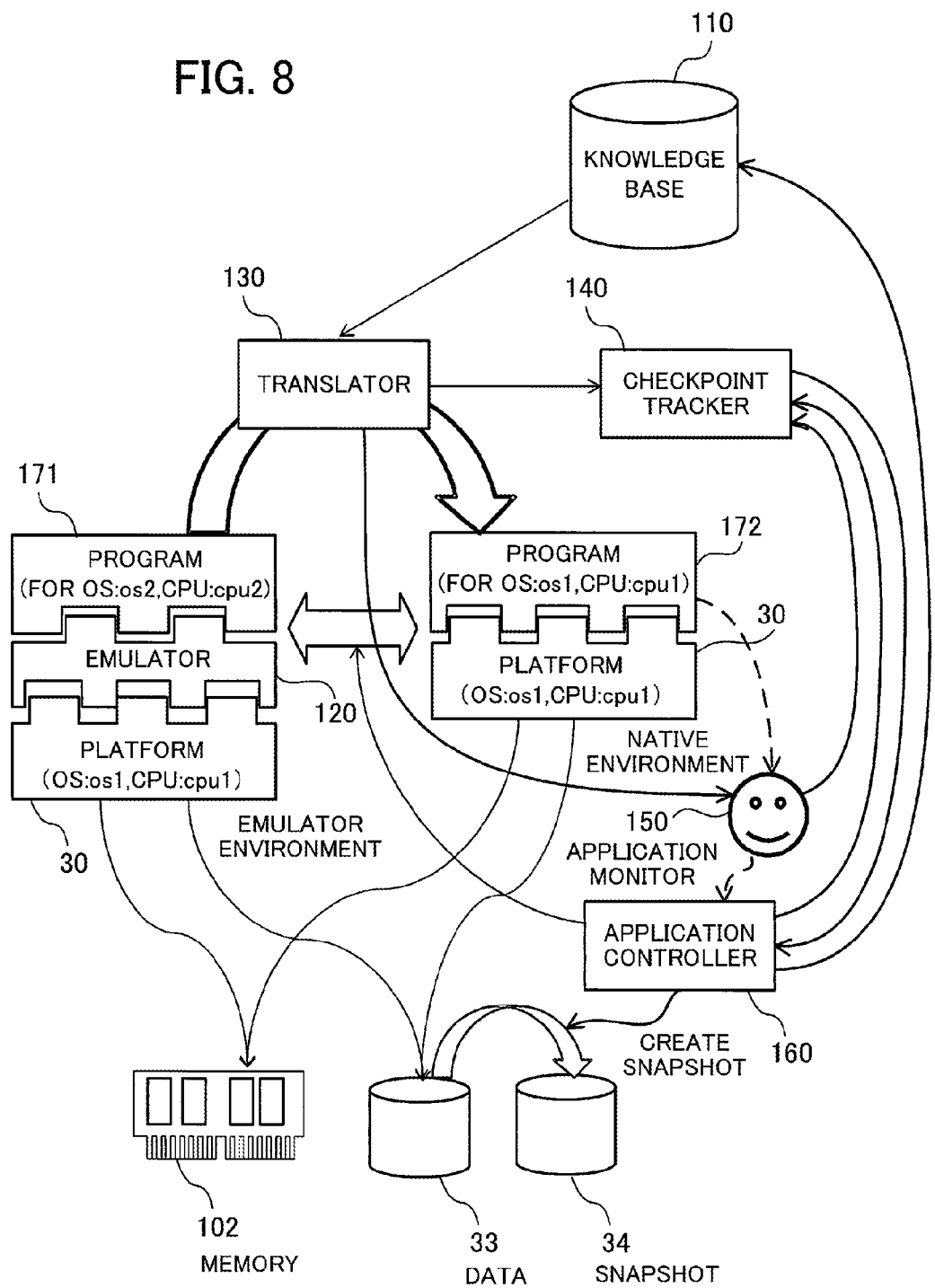
FIG. 8 illustrates an exemplary program migration in the second embodiment.

FIG. 8 illustrates an exemplary program migration in the second embodiment. The computer 100 has two types of execution environments of programs: the emulator environment and the native environment. The emulator environment is an environment in which the program 171 is executed via the emulator 120 being performed on a platform 30. The native environment is an environment in which the program 172 is executed using the platform 30. The emulator environment and the native environment share resources such as the memory 102 or the HDD 103. In the second embodiment, execution of the program 171 in the emulator environment and execution of the program 172 in the native environment are not performed in parallel but only one of the programs is executed at a certain time point.

In the example of FIG. 8, the type of the processor 101 is "cpu1" and the type of the OS 180 is "os1" in the original operational environment (operational environment provided by the platform 30) of the computer 100. In contrast, the program 171 to be migrated has been created from the binary code for a platform with the processor type "cpu2" and the OS type "os2". The program 171 is therefore executed by the emulator 120. Accordingly, the cloud system 20 allows an early execution start of the program 171 to be migrated, without waiting for completion of the re-compilation or code conversion of the program.

There is also a case where an element other than the type of processor or OS is specified as an operational environment in which a program is executable. It may be, for example, the type of the interface for accessing the HDD. In such a case, the emulator 120 reproduces the information processing in the operational environment in which the program 171 is executable, together with the processing performed by a resource other than the processor or the OS. In addition, the translator 130 generates the program 172 which is also adapted to the resource configuration of the computer 100 other than the processor or the OS.

Additionally, in parallel with the execution of the program 171 in the emulator environment, the translator 130 converts the binary code of the program 171 into a binary code which is directly executable by the platform 30. As a result, the program 172 described by the converted binary code is generated. For example, the translator 130 performs the binary code conversion, referring to the knowledge 111 in the knowledge base 110. In addition, the translator 130 creates, and notifies to the checkpoint tracker 140, a checkpoint for each appropriate unit of binary conversion. Upon receiving the notification, the checkpoint tracker 140 stores, in the checkpoint information 141, the correspondence relation between the binary code of the conversion source in code conversion and the converted binary code.

While the translator 130 is performing code conversion, the application monitor 150 monitors the execution status of the code conversion. The application monitor 150 notifies the application controller 160 of the completion of the code conversion and the generation of the program 172 upon detection thereof.

Upon receiving the notification of completion of the code conversion, the application controller 160 terminates the execution of the program 171 in the emulator environment, and also starts execution of the program 172 in the native environment. For example, the application controller 160 instructs the emulator 120 to terminate the execution of the program 171. In addition, the application controller 160 instructs the OS providing the platform 30 to execute the program 172.

When execution of the program 172 in the native environment is started, the application monitor 150 monitors the execution status of the program 172, and notifies the execution status of the program 172 to the application controller 160 and the checkpoint tracker 140. The checkpoint tracker 140, upon receiving the execution status of the program 172, counts the number of execution times for each of the block groups having the same checkpoint number assigned thereto. The checkpoint tracker 140 then updates the value of the number of execution times in the checkpoint information 141.

The application controller 160 recognizes the result of operation of the program 172 according to the notification from the application monitor 150, and registers the result of operation in the knowledge base 110. For example, when the program 172 has been normally executed, the application controller 160 registers in the knowledge 111 that the operation has been successful for the algorithm applied to the code conversion from the program 171 to the program 172.

In addition, while the program 172 is being executed, the application controller 160 creates, at a predetermined timing, a snapshot 34 of a data set 33 in the storage area being used for execution of the program 172 in the memory 102 or the HDD 103. The snapshot 34 is stored in the HDD 103, for example. The timing of creating the snapshot 34 is, for example, the timing of a checkpoint. Instead of creating a snapshot at every checkpoint, a snapshot may be created when, for example, a predetermined number of checkpoints have been passed as execution points of the program 172.

In addition, the application controller 160 terminates the execution of the converted program 172 when the program 172 does not operate normally, and resumes the execution of the program 171 to be migrated. Such an operation is referred to as program switch back. When program switch back is performed, the application controller 160 writes back to the memory 102 and the HDD 103 the data of the latest snapshot for which normal operation has been confirmed. The application controller 160 then instructs the emulator 120 to start the execution of the program 171.

When program switch back is performed, the translator 130 performs the code conversion again, and re-creates a program having the binary code adapted to the native environment. When the code conversion is performed again, the translator 130 applies a different algorithm from that used in the previous code conversion.

As thus described, the execution of the program 171 in the emulator environment is automatically resumed when the converted program 172 does not operate normally, and code conversion is performed according to a different algorithm. Accordingly, it becomes possible to generate a highly reliable program.

Figure 9:
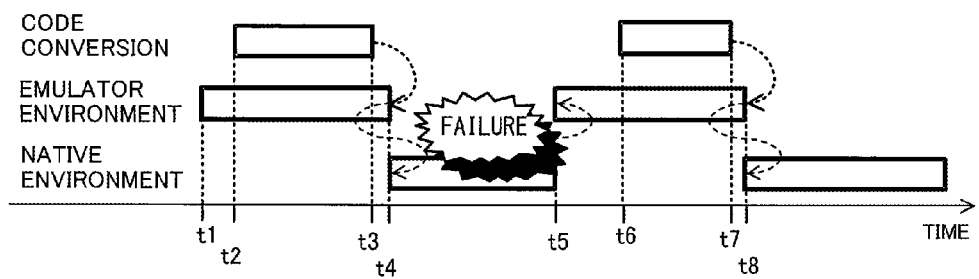
FIG. 9 illustrates an exemplary switching of operational environments in the second embodiment.

FIG. 9 illustrates an exemplary switching of operational environments in the second embodiment. In FIG. 9, the time axis lies in the horizontal direction, with respective execution periods of code conversion, program execution in the emulator environment, and program execution in the native environment being illustrated in sequence from the top.

When a program migration process is started, execution of the original program 171 in the emulator environment is started first at time t1. Next, code conversion of the program 171 is started at time t2.

When the code conversion is completed at time t3, the execution of the program in the emulator environment is terminated at a subsequent time t4 and execution of the program in the native environment is started. The program executed in the native environment is the program generated by code conversion.

In the example of FIG. 9, a failure in normal execution of the program is detected at time t5 during execution of the program in the native environment. When a failure is detected, the execution of the program in the native environment is terminated and execution of the program in the emulator environment is resumed. Subsequently, the code conversion process is resumed at time t6, whereby code conversion of the program is performed again. In the re-executed code conversion, a translation algorithm which is different from that used in the previously performed code conversion is applied to at least a part of the binary codes.

Upon completion of the second code conversion at time t7, the execution of the program in the emulator environment is terminated at a subsequent time t8, and execution of the program in the native environment is started.

In the second embodiment, as thus described, the execution of the program is immediately switched to that in the native environment upon completion of the code conversion. Upon occurrence of a failure, the execution of the program in the emulator environment is immediately resumed. As thus described, switching between the execution of the program in the emulator environment and the execution of the program in the native environment may prevent occurrence of an idle period in the execution of the program. Furthermore, the code conversion will be re-executed with the different translation algorithm when a failure occurs and therefore it becomes possible to generate a highly reliable program ultimately.

Next, a procedure of the program migration process according to the second embodiment will be described in detail.

Figure 10:
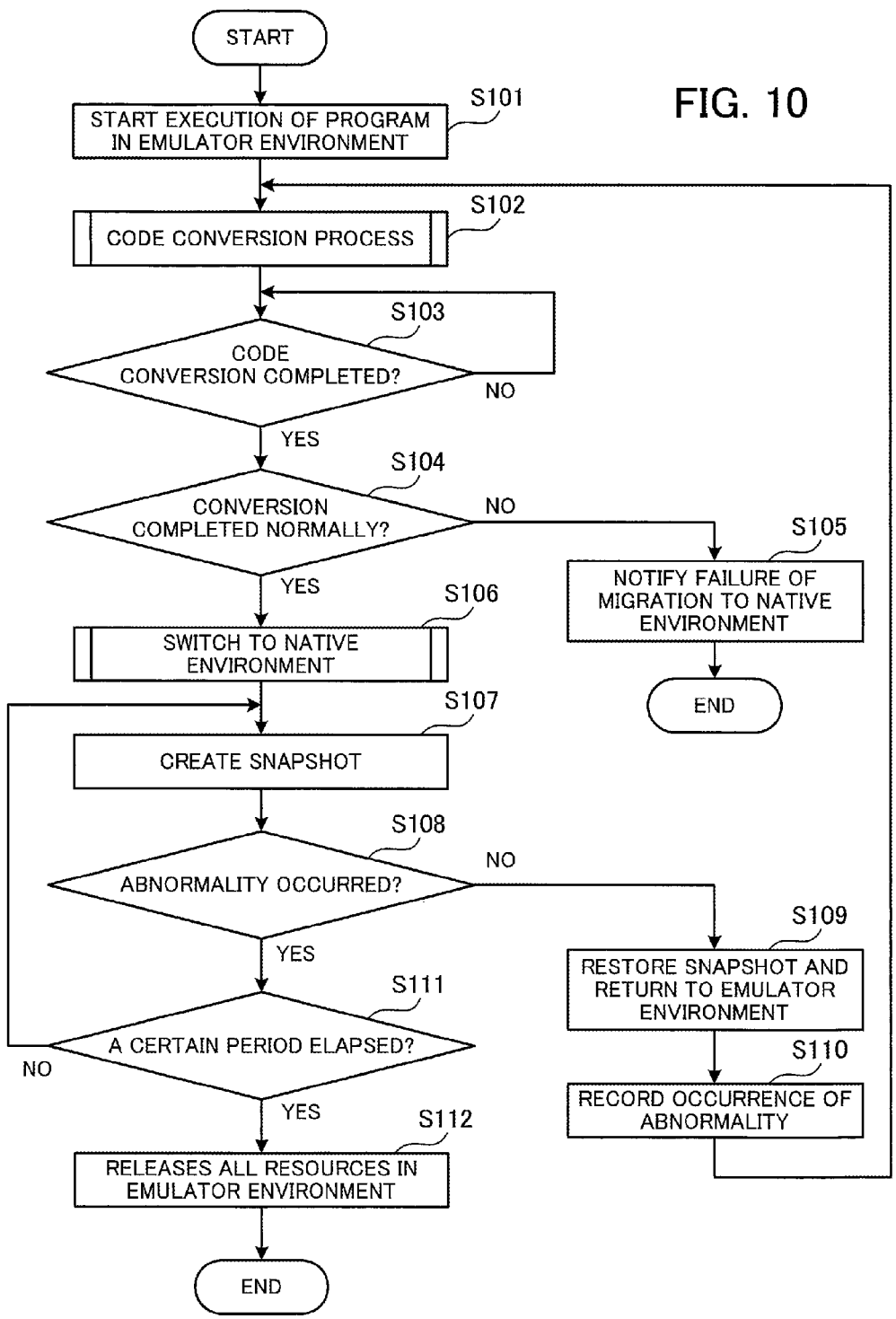
FIG. 10 is a flowchart illustrating an exemplary procedure of a program migration process in the second embodiment.

FIG. 10 is a flowchart illustrating an exemplary procedure of a program migration process in the second embodiment. The following procedure is performed when a migration instruction specifying the program to be migrated is input. It is assumed in the following description that a migration instruction specifying the program 171 illustrated in FIG. 8 has been input.

(Step S101) The emulator 120 starts execution, in the emulator environment, of the program 171 specified to be migrated. For example, the emulator 120 emulates, on the platform 30 of the computer 100, the operational environment in which the program 171 is executable. The emulator 120 then interprets the binary code of the program 171, converts the same into a code which is executable on the platform 30, and causes the processor 101 of the computer 100 to perform the processing. From then on, the emulator 120 continues the execution of the program 171 until instructed to terminate the execution of the program 171.

(Step S102) The translator 130 starts the conversion of the binary code of the program 171 specified to be migrated. Details of the code conversion process will be described below (see FIG. 11).

(Step S103) The application monitor 150 determines whether or not the conversion of the binary code has been completed. For example, the application monitor 150 determines that the conversion of the binary code has been completed when a notification of completion of the code conversion is acquired from the translator 130. In addition, the application monitor 150 determines that the code conversion has been completed when, for example, the conversion process of the binary code being performed by the translator 130 is terminated. When the code conversion has been completed, the process flow proceeds to step S104. When the code conversion has not been completed, the processing at step S103 is repeated.

(Step S104) The application monitor 150 determines whether or not the code conversion has been normally completed. The application monitor 150 determines that the code conversion normally completed when, for example, the translator 130 has been terminated after outputting a message indicating a normal termination, and the code indicates the end of the program. In addition, the application monitor 150 determines that the code conversion has not been normally completed when, for example, the translator 130 has been terminated after outputting an error message. When the code conversion has been normally completed, the process flow proceeds to step S106. When the code conversion has not been normally completed (the case of abnormal termination), the process flow proceeds to step S105.

(Step S105) In the case of abnormal termination, the application monitor 150 notifies the user who instructed to migrate the program that the migration to the native environment has failed. For example, the application monitor 150 outputs a migration failure message as a response to the program emigration instruction input by the user. The output message is displayed, for example, on the terminal used by the user. Subsequently, the program migration process is terminated.

(Step S106) When the code conversion has been normally terminated, the application controller 160 performs a switching process to the native environment. The switching process to the native environment terminates the execution of the program 171 in the emulator environment and starts execution of the program in the native environment. Details of this processing will be described below (see FIG. 12).

(Step S107) The application controller 160 creates a snapshot of a predetermined area in the HDD 103 at a predetermined timing. For example, the application controller 160 creates a snapshot of at least the storage area being used by the program 172, within the storage area of the HDD 103. The timing of the snapshot is, for example, the timing at which the execution point of the program 172 has reached a checkpoint after a predetermined period has elapsed from the previous snapshot. The acquisition timing of a snapshot may be set in any manner. For example, a snapshot may be created each time the execution point of the program 172 reaches a checkpoint.

(Step S108) The application controller 160 determines whether or not an abnormality has occurred during the execution of the program 172 in the native environment. For example, the application controller 160 determines that an abnormality has occurred when the program 172 has been terminated without outputting a code which has been expected to be output when giving a normal response. When an abnormality has occurred during the execution of the program 172, the process flow proceeds to step S109. When no abnormality has occurred during the execution of the program 172, the process flow proceeds to step S111.

(Step S109) When an abnormality has occurred during the execution of the program 172, the application controller 160 restores the state of the HDD 103 at the timepoint of creating the snapshot, based on the most recent snapshot. The application controller 160 then terminates the execution of the program 172 in the native environment, and resumes the execution of the program 171 in the emulator environment. When, on this occasion, the execution of the program 172 in the native environment has not been terminated, the application controller 160 forcibly terminates the execution of the program 172.

The execution of the program 171 in the emulator environment may be resumed after having received an instruction from the operator. For example, the application controller 160 displays, on the terminal used by the operator, that preparation for re-execution of the program 171 in the emulator environment has completed. When the operator performs an operation instructing re-execution, the application controller 160 starts re-executing the program 171 in the emulator environment.

(Step S110) The application controller 160 records the occurrence of an abnormality. For example, the application controller 160 registers, in the translation algorithm evaluation table 111*c* in the knowledge base 110, "operation failed" as the result of operation of the part of the translation algorithm being executed at the time of occurrence of the abnormality. Subsequently, the process flow proceeds to step S102, where the code conversion is performed again.

(Step S111) When no abnormality has occurred during the execution of the program 172, the application controller 160 determines whether or not a certain time or longer has elapsed since the execution of the program 172 started. When a certain time or longer has elapsed, the process flow proceeds to step S112. When a certain time or longer has not elapsed, the process flow proceeds to step S107.

(Step S112) When a certain period or longer has elapsed without detecting an abnormality since the start of the execution of the program 172, the application controller 160 releases all the resources which have been secured in order to execute the program 171 in the emulator environment. For example, the memory area which has been occupied by the process executing the program 171 is released. Subsequently, the program migration process is terminated.

In this manner, it is possible to realize a highly reliable code conversion while switching between the execution of the program 171 to be migrated in the emulator environment and the execution of the converted program 172 in the native environment. The code conversion is performed, for example, based on the knowledge 111 registered in the knowledge base 110.

In the following, the code conversion process will be described in detail.

Figure 11:
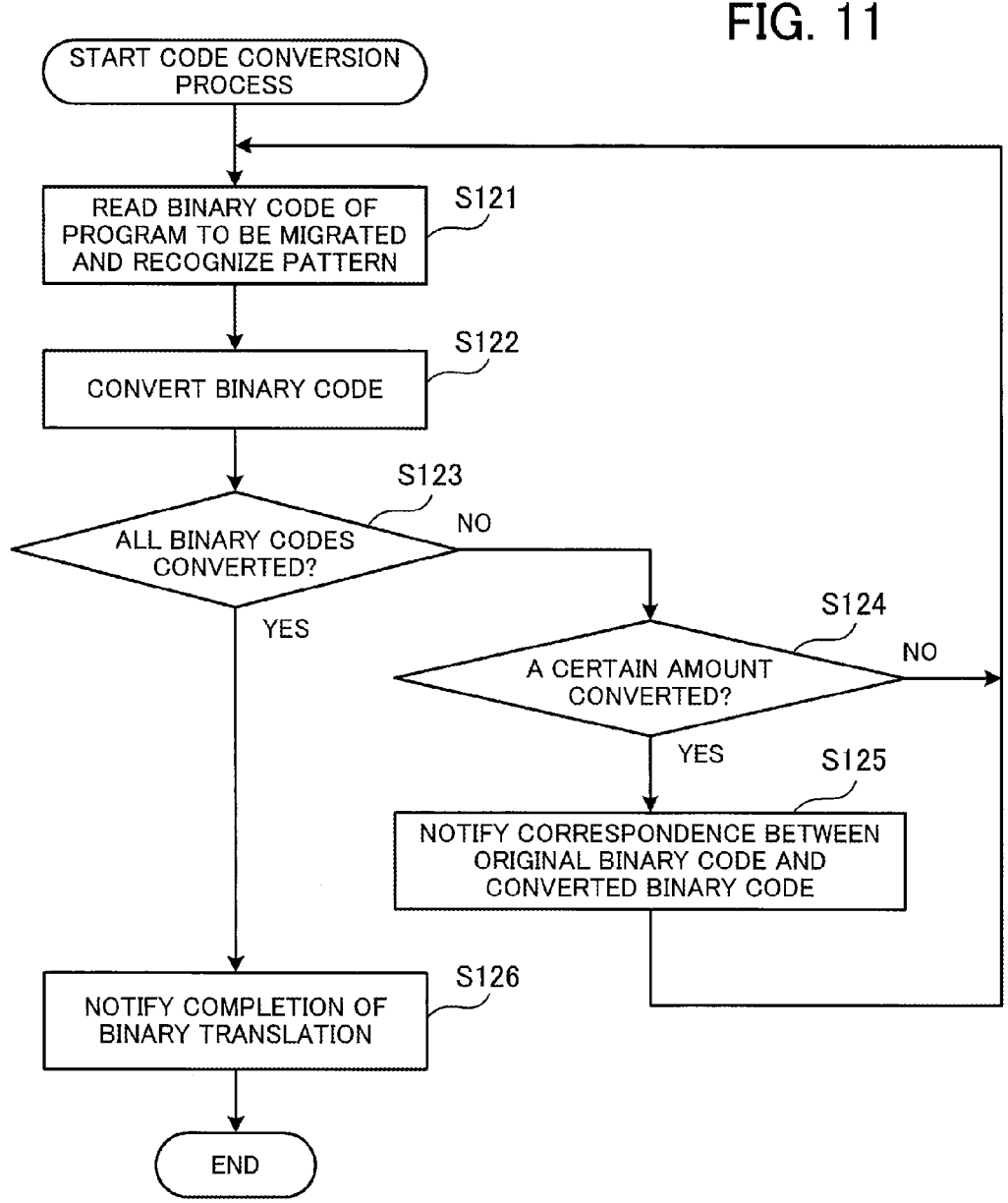
FIG. 11 is a flowchart illustrating an exemplary procedure of a code conversion process.

FIG. 11 is a flowchart illustrating an exemplary procedure of code conversion process.

(Step S121) The translator 130 reads a plurality of binary codes of the program 171 to be migrated, and recognizes the code pattern. For example, the translator 130 reads the binary code from the top of the program 171 sequentially in terms of blocks. The translator 130 then recognizes the code pattern of the read binary code at the implementation level, and abstracts the pattern.

(Step S122) The translator 130 converts a plurality of extracted binary codes, with a translation algorithm for the code pattern of the binary codes. For example, the translator 130, referring to the knowledge base 110, detects, from the original code pattern list 111*a*, an original code pattern which matches the code pattern abstracted from the read-out binary code. Next, the translator 130, referring to the translation algorithm evaluation table 111*c*, extracts one or more translation algorithms associated with the detected original code pattern. The translator 130 then determines one of the extracted translation algorithms as the algorithm to be applied. For example, when a plurality of translation algorithms has been extracted, the translator 130 determines, with the highest priority, the translation algorithm whose operation result is "operation succeeded" as the algorithm to be applied. When there is no translation algorithm whose operation result is "operation succeeded", the translator 130 determines a translation algorithm waiting confirmation as the algorithm to be applied. Upon determining the translation algorithm to be applied, the translator 130 extracts the translation algorithm of interest from the translation algorithm list 111*b*. The translator 130 then converts the extracted binary code into another binary code according to the extracted translation algorithm.

(Step S123) The translator 130 determines whether or not all the binary codes in the program 171 to be migrated have been converted. When conversion of all the binary codes has been completed, the process flow proceeds to step S126. When there exists a yet-to-be-converted binary code, the process flow proceeds to step S124.

(Step S124) The translator 130 determines whether or not a certain amount of binary codes has been converted. For example, the translator 130 determines that a certain amount of binary codes has been converted when the number of original binary codes which have been converted by code conversion which has not been notified to the checkpoint tracker 140 after conversion has become equal to or larger than a preset value. When a certain amount of binary codes has been converted, the process flow proceeds to step S125. When a certain amount of binary codes has not been converted, the process flow proceeds to step S121.

(Step S125) The translator 130 notifies the checkpoint tracker 140 of the content of the conversion of a certain amount of binary codes whose content of conversion is yet to be notified. The content of conversion to be notified is, for example, the correspondence relation between the original binary code and the converted binary code, and the applied translation algorithm. In the notification, the original binary code is identified, for example, by the leading address and the size of the binary code in the program to be migrated. Additionally, in the notification, the converted binary code is identified, for example, by the leading address and the size of the binary code in the program to be migrated. Having received the notification, the checkpoint tracker 140 registers the content of the notification in the checkpoint information 141 (see FIG. 7). Subsequently, the process flow proceeds to step S121.

(Step S126) The translator 130 notifies the application monitor 150 of completion of the code conversion. When the code conversion has been normally terminated on this occasion, the translator 130 transmits, for example, a message indicating the normal termination to the application monitor 150.

In this manner, it is possible to perform the code conversion and also store the content of the conversion in the checkpoint information 141.

Next, details of the switching process to the program 172 in the native environment will be described.

Figure 12:
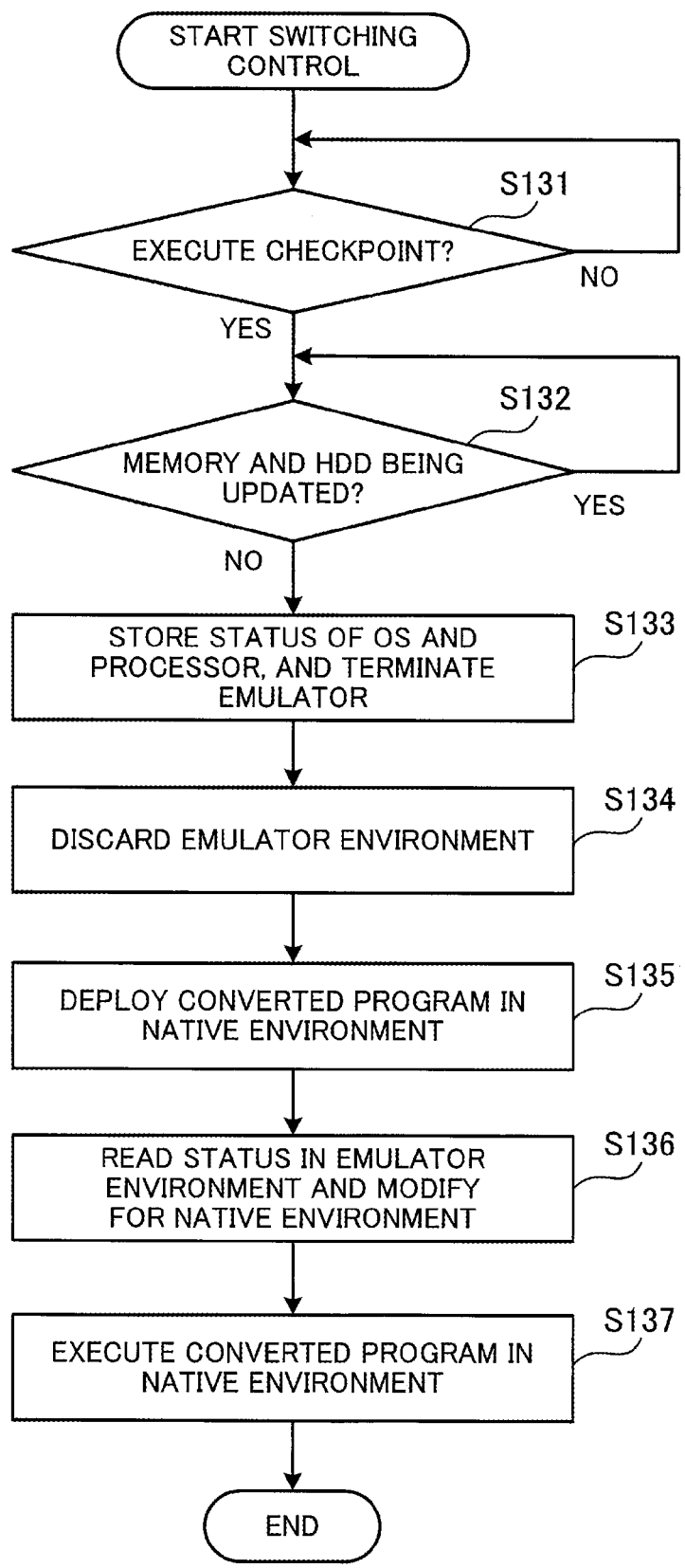
FIG. 12 is a flowchart illustrating an exemplary procedure of a switching process to a native environment.

FIG. 12 is a flowchart illustrating an exemplary procedure of switching process to the native environment.

(Step S131) The application controller 160 determines whether or not the next execution point, by the emulator 120, of the program 171 to be migrated is the position of a binary code specified as a checkpoint. When the binary code of the checkpoint is executed, the process flow proceeds to step S132. When the checkpoint has not been reached, the processing at step S131 is repeated.

(Step S132) The application controller 160 determines whether or not the memory 102 or the HDD 103 is being updated. When it is being updated, the processing at step S132 is repeated. When it is not being updated, the process flow proceeds to step S133.

(Step S133) The application controller 160 stores the status of the OS and the processor in the emulator environment, and terminates the emulator 120. For example, the application controller 160 writes, to the memory 102 or the HDD 103, the content of the register of a virtual processor being emulated by the emulator 120. The application controller 160 then instructs the emulator 120 to terminate the processing. Accordingly, the emulator environment turns into a stationary state.

(Step S134) The application controller 160 discards the emulator environment. For example, the application controller 160 releases the environment of the OS 180 occupied by the execution process of the program 171 and the emulator 120. For example, the memory space assigned to the execution process of the program 171 and the emulator 120 is released.

(Step S135) The application controller 160 deploys the converted program 172 in the memory area of the native environment.

(Step S136) The application controller 160 reads the status of the OS and the processor stored at step S133, and modifies the program counter or the like as appropriate for the native environment. For example, the application controller 160 sets, to the register of the processor 101 in the native environment, the value of the register in the processor emulated by the emulator 120 when the emulator environment is stationary. On this occasion, the application controller 160 sets, to the program counter of the processor 101, the storage address of the binary code in the converted program 172 corresponding to the binary code of the program 171 to be migrated, which turns out to be the next execution point.

The correspondence relation between the binary code of the program 171 to be migrated and the binary code of the converted program 172 may be recognized by interrogating the checkpoint tracker 140. For example, the application controller 160 specifies the position of the program to be migrated corresponding to the address indicated by the program counter in the emulator environment, and transmits the corresponding address acquisition request to the checkpoint tracker 140. Referring to the checkpoint information 141, the checkpoint tracker 140 locates the position of the converted program 172 corresponding to the specified position of the program 171 to be migrated. The checkpoint tracker 140 then notifies the application controller 160 of the located position (e.g., offset from the top of the program 172). The application controller 160 sets, in the program counter at the time of executing the program 172, the address corresponding to the notified position in the memory space in which the converted program 172 has been deployed.

(Step S137) The application controller 160 outputs, to the OS 180, an execution instruction of the converted program 172 in the native environment. The OS 180 then starts execution of the program 172.

In this manner, it is possible to reconstruct, in the native environment, the execution status of the program 171 in the emulator environment, and start the execution of the program 172 in the native environment from the position of the converted program 172 corresponding to the position of the program to be migrated in a stationary state.

In the second embodiment as has been described above, the emulator 120 allows an early execution start of the program 171 to be migrated in the computer 100 when the migration process of the program 171 is started. Furthermore, the code conversion by the translator 130 is performed in parallel with the execution of the program 171 by the emulator 120 and, when the code conversion is completed, the execution of the program 171 is automatically switched to the execution of the converted program 172 in the native environment. Accordingly, it is possible to execute the program 172 without being intervened by an extra processing such as the emulator 120 after the migration process has been completed, whereby efficient processing is realized. Accordingly, it becomes possible to spare the use of the emulator 120 after the program migration process has been completed, while maintaining the short preparation period for the migration of the system environment owing to the use of the emulator 120.

Furthermore, after the program migration process has been completed, it suffices to use a small amount of resources for the execution of the migrated program 172.

Figure 13:
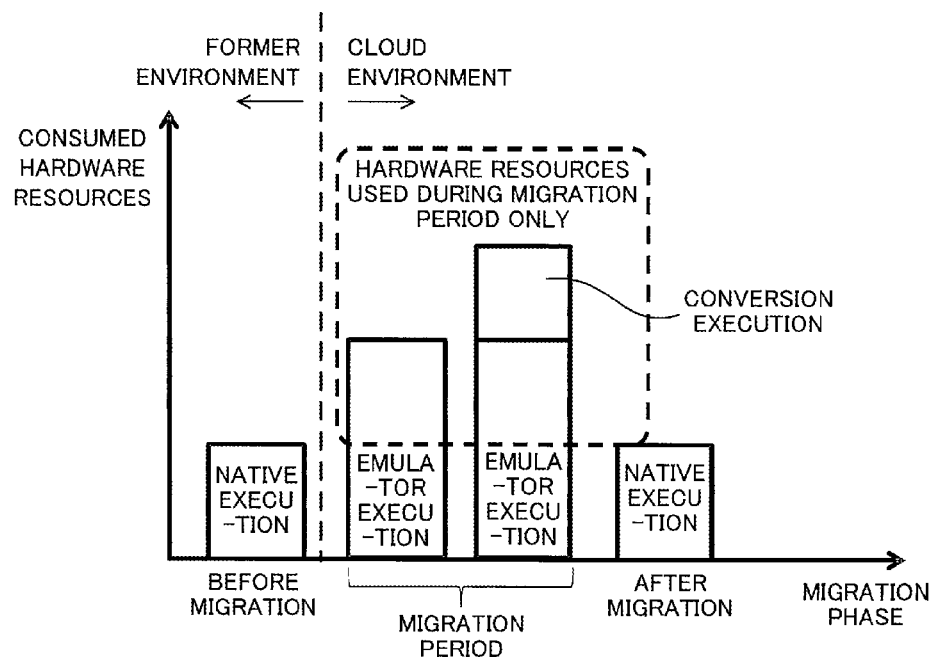
FIG. 13 illustrates an exemplary transition of the amount of hardware resources consumed due to the program migration in the second embodiment.

FIG. 13 illustrates an exemplary transition of the amount of hardware resources consumed due to the program migration in the second embodiment. In FIG. 13, the horizontal axis indicates the migration phase, and the vertical axis indicates the amount of consumed hardware resources. Here, the amount of hardware resources expresses the amount of consumed resources such as processor, memory, disk, or the like, as an abstract index of the hardware.

Prior to the program migration process, the program 171 to be migrated is executed in the native environment by a computer having, as the platform, the operational environment of the program 171. Therefore, the amount of consumed hardware resources is small in comparison with the execution via the emulator.

When the migration process of the program 171 is started from the aforementioned state, the program 171 to be migrated is first executed by the emulator 120 in the computer 100 which is the migration destination. The emulator 120 performs a complicated process of emulating the operation of a platform which is different from that of the computer 100. Accordingly, more resources are consumed than the native environment. Subsequently, the code conversion of the program 171 is started in the computer 100, and still more resources are consumed.

Upon completion of the code conversion process, the converted program 172 is also executed in the native environment in the migration destination computer 100. It is therefore possible to execute the program 172 in the native environment with less consumed resources after the program migration process is completed.

Accordingly, it becomes possible to use the resources efficiently by suppressing the amount of consumed resources after the migration of the program. Migration to a cloud system of an application program having been used by a company in a closed intra-company system allows the company to reduce the cost and workload relating to possession and maintenance of the computer system. In addition, the cloud system allows the user to use as much system resources as needed at a desired time for example, and be charged on a pay-by-use basis. Therefore, migrating a program using the technique of the second embodiment to a cloud system allows a company to reduce the cost associated with the use of the cloud system.

When the program migration destination is a company-owned system, for example, there does not arise the problem of charging as with the cloud system. However, when the program migration using an emulator, for example, without applying the technique of the second embodiment is performed, the emulator is also kept operating. In such a case, there arises a cost of purchasing and maintaining a computer with a surplus processing ability. Applying the technique of the second embodiment to a company-owned system allows the company to operate the system with a small amount of hardware resources after the migration process is completed, whereby the operation cost such as maintenance cost may be reduced.

In addition, when switching the program execution environment from the emulator environment to the native environment in the second embodiment, the processing is performed in the native environment from a position of the program 172 corresponding to the execution point of the program 171 when the emulator environment has been terminated. Accordingly, an efficient switching is performed without redoing or skipping the processing when switching from the processing by the program 171 to the processing by the program 172.

Furthermore, in the second embodiment, upon occurrence of a failure after the execution of the converted program 172 is started in the native environment, the execution of the program 171 to be migrated in the emulator environment is immediately resumed. Accordingly, it is possible to provide, in a stable manner, the information processing service by executing the program 171 or the program 172 by the migration destination computer 100.

Furthermore, upon occurrence of a failure after the start of the execution of the converted program 172 in the native environment, code conversion is performed by a different conversion algorithm. Accordingly, it is possible to automatically perform code conversion to a highly reliable program.

Third Embodiment

Next, a third embodiment will be described. The third embodiment switches the program's operating environment from the emulator environment to the native environment by a parallel operation system. The parallel operation system performs the program execution in the emulator environment and the program execution in the native environment concurrently in the course of switching the program's operating environment. In the following, the difference between the second embodiment and the third embodiment will be described. The same elements as those in the second embodiment are provided with the same symbols, with the description thereof being omitted.

Figure 14:
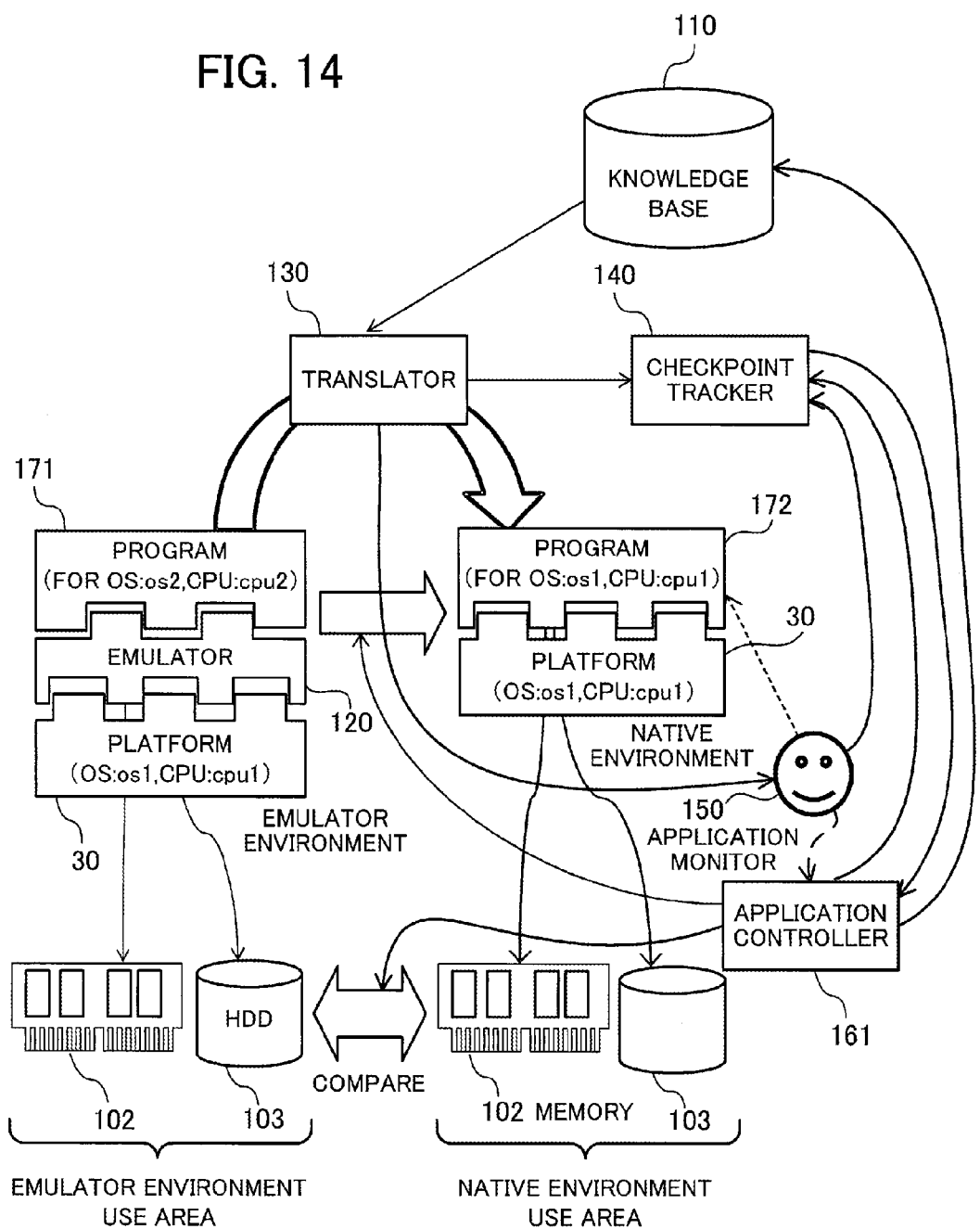
FIG. 14 illustrates an exemplary program migration in a third embodiment.

FIG. 14 illustrates an exemplary program migration in the third embodiment. In the third embodiment, the processing by an application controller 161 is different from that in the second embodiment. The application controller 161 in the third embodiment continues the execution of the program 171 in the emulator environment even after the code conversion by the translator 130 is completed. Accordingly, the programs 171 and 172 are operated in parallel in both the emulator environment and the native environment.

In parallel operation, resources such as the memory 102 and the HDD 103 are not shared. In other words, the storage area of the memory 102 and the HDD 103 used for executing the program 171 in the emulator environment, and the storage area of the memory 102 and the HDD 103 used for executing the program 172 in the native environment are separate areas. While operating the programs in parallel in the emulator environment and the native environment, the application controller 161 compares the contents of the memory 102 and the HDD 103 to confirm that the programs are normally operating. When an abnormality is detected in the native environment as the result of comparison, the translator 130 attempts to perform the code conversion again. The cause of the abnormality when the abnormality has occurred is registered in the knowledge base 110. When attempting re-translation, the translator 130 performs the code conversion with a different conversion algorithm from that of the previous time, referring to the knowledge 111 in the knowledge base 110. Accordingly, information of the binary translation is sequentially accumulated, whereby the precision of the code conversion may be gradually improved.

Figure 15:
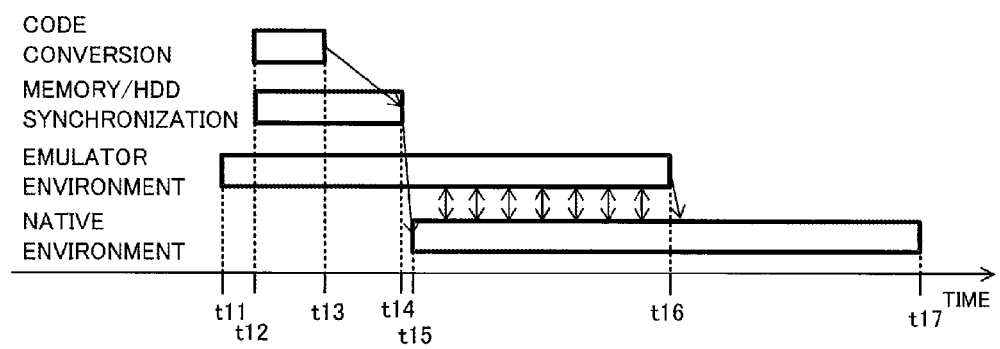
FIG. 15 illustrates an exemplary switching of operational environments in the third embodiment.

FIG. 15 illustrates an exemplary switching of operational environments in the third embodiment. In FIG. 15, the time axis lies in the horizontal direction, with respective execution periods of code conversion, memory/HDD synchronization, program execution in the emulator environment, and program execution in the native environment being illustrated in sequence from the top.

When a program migration process is started, execution of the original program 171 in the emulator environment is first started at time t11. Next, at time t12, code conversion of the program 171 is started, and also the memory 102 and the HDD 103 are synchronized. The synchronization of the memory 102 and the HDD 103 is a process of storing, in the storage area used in the native environment, a copy of a data set stored in the storage area to be used for the execution of the program 171 in the emulator environment.

The code conversion is completed at time t13, and the synchronization of memory/HDD is completed at a subsequent time t14. After both of the code conversion and the synchronization of the memory/HDD are completed, execution of the program 172 in the native environment is started at time t15.

The execution of the program 171 in the emulator environment and the execution of the program 172 in the native environment are performed in parallel for a predetermined period. During the period, a comparison process between data stored in the memory 102 and data stored in the HDD 103 in the emulator environment and the native environment is performed at a predetermined interval. As long as the data stored in the memory 102 and the data stored in the HDD 103 match each other according to the comparison process, it is determined that the converted program 172 is normally operating in the native environment. When the period during which the converted program 172 is normally operating in the native environment reaches a predetermined period at time t16, the execution of the program 171 in the emulator environment is terminated.

For the comparison of the data in the memory 102 and the HDD 103, a snapshot may be created at a predetermined timing, for example. In such a case, the comparison is performed by the data of the snapshot. Accordingly, the comparison of data may prevent the progress of the processing based on a program from delaying.

Next, a procedure of the program migration process in the third embodiment will be described.

Figure 16:
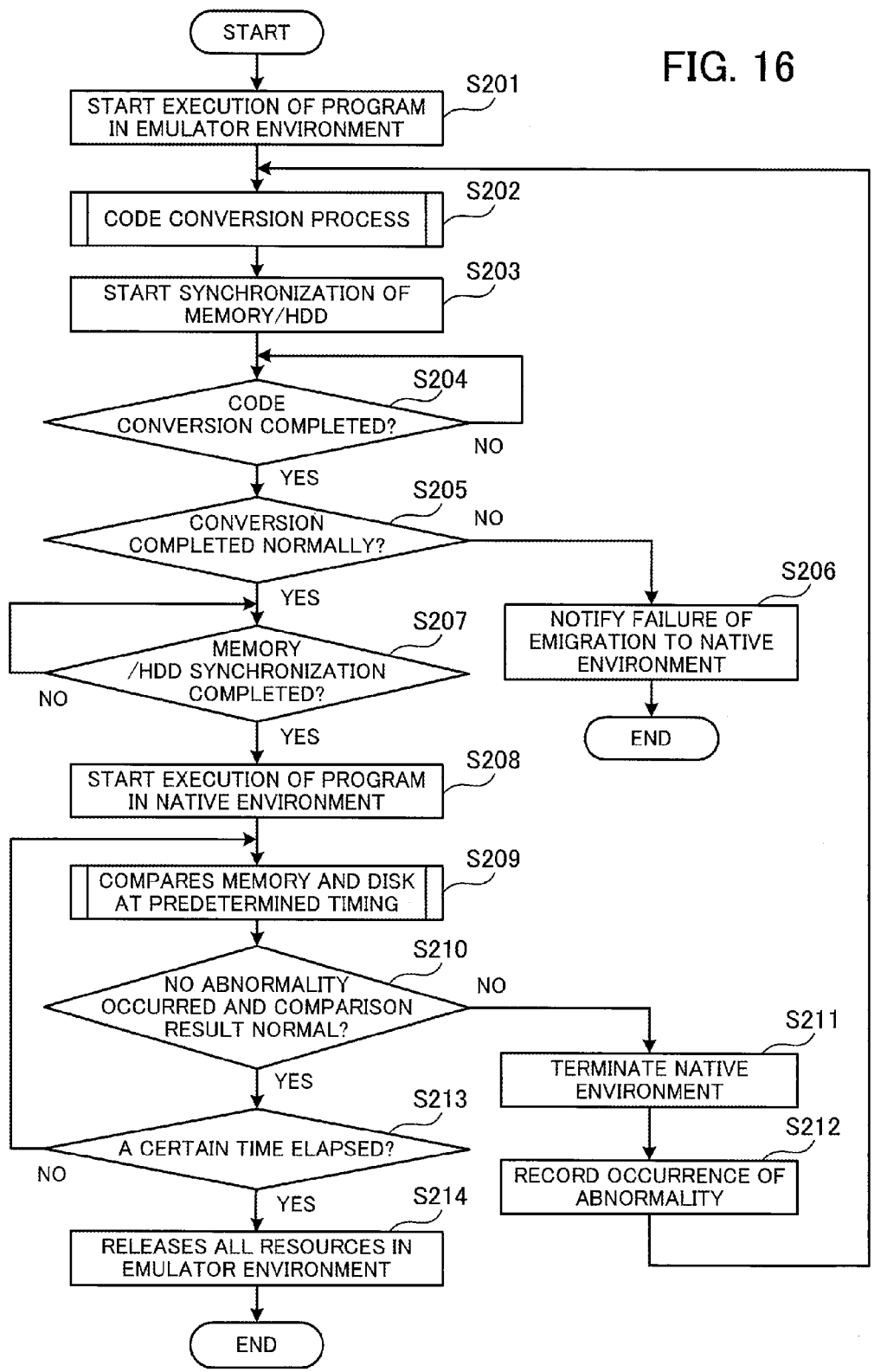
FIG. 16 is a flowchart illustrating an exemplary procedure of a program migration process in the third embodiment.

FIG. 16 is a flowchart illustrating an exemplary procedure of the program migration process in the third embodiment.

(Step S201) The emulator 120 starts execution, in the emulator environment, of the program 171 specified to be migrated.

(Step S202) The translator 130 starts the conversion of the binary code of the program 171 specified to be migrated. Details of the processing are as described referring to FIG. 11.

(Step S203) The application controller 161 starts synchronization of the contents of the storage area of the memory and the HDD used in the emulator environment and the storage area of the memory and the HDD used in the native environment. For example, the application controller 161 secures, in the memory 102 and the HDD 103, a storage area to be used for the execution of the program 172 in the native environment. The application controller 161 then performs synchronization processing of the storage area for the emulator environment and the storage area secured for the native environment. The synchronization processing stores a copy of the data stored in the storage area for the emulator environment in a storage area secured for the native environment.

(Step S204) The application monitor 150 determines whether or not the conversion of the binary code has been completed. When the code conversion has been completed, the process flow proceeds to step S205. When the code conversion has not been completed, the processing at step S204 is repeated.

(Step S205) The application monitor 150 determines whether or not the code conversion has been normally completed. When the code conversion has been normally completed, the process flow proceeds to step S207. When the code conversion has not been normally completed (the case of abnormal termination), the process flow proceeds to step S206.

(Step S206) In the case of abnormal termination, the application monitor 150 notifies the user who has instructed the program migration of the failure of migration to the native environment. Subsequently, the program migration process is terminated.

(Step S207) The application controller 161 determines whether or not the synchronization of the contents of the memory and the HDD has been completed. When the synchronization has been completed, the process flow proceeds to step S208. When the synchronization has not been completed, the processing at step S207 is repeated.

(Step S208) When the execution point of the program 171 in the emulator environment has reached a checkpoint, the application controller 161 starts execution of the program 172 in the native environment. On this occasion, the execution of the program 171 in the emulator environment is still continuing. In such a case, communication with the outside is performed, for example, by a process executing the program 171 in the emulator environment. In other words, a request to the service provided by executing the program 171 to be migrated or the converted program 172 is input to the process executing the program 171. In addition, a response to the request is output from a process executing the program 171.

(Step S209) The application controller 161 compares the contents of the memory and the HDD at a predetermined timing. For example, when the execution point of the program 171 in the emulator environment has reached a checkpoint, the application controller 161 creates a snapshot of data in the memory and the HDD in both the emulator environment and the native environment. Using the created snapshot, the application controller 161 then compares the data in the storage area used for the execution of the program 171 with the data in the storage area used for the execution of the program 172. Details of the processing will be described below (see FIGS. 17 to 19).

(Step S210) The application controller 161 determines whether or not an abnormality has not occurred in the parallel processing of the programs and the result of comparison is normal. For example, the application controller 161 determines that an abnormality has occurred when a notification of abnormal termination of the program 171 to be migrated or the converted program 172 is received from the application monitor 150. Alternatively, the application controller 161 determines that the result of comparison is abnormal when, as the result of comparison at step S209, there is a mismatch between the data in the storage area in the emulator environment and the data in the storage area in the native environment. When no abnormality has been detected, the process flow proceeds to step S213. When an abnormality has been detected, the process flow proceeds to step S211.

(Step S211) When an abnormality has been detected, the application controller 161 terminates the execution of the program 172 in the native environment.

(Step S212) The application controller 161 records the occurrence of abnormality. Subsequently, the process flow proceeds to step S202.

(Step S213) When no abnormality has occurred, the application controller 161 determines whether or not a certain time or longer has elapsed since the start of the execution of the program 172. When a certain time or longer has elapsed, the process flow proceeds to step S214. When a certain time or longer has not elapsed, the process flow proceeds to step S209.

(Step S214) When a certain time or longer has elapsed since the start of the execution of the program 172 without detecting an abnormality, the application controller 161 terminates the execution of the program 171 in the emulator environment. The application controller 161 then releases all the resources secured for executing the program 171 in the emulator environment. The communication destination from the outside to the service provided by the execution of the program 171 or the program 172 is switched by the application controller 161 to the process executing the program 172 in the native environment.

In this manner, the program migration is performed via a parallel operation state. During the parallel operation state, the identicalness between the execution status of the program 171 being executed in the emulator environment and the execution status of the program 172 being executed in the native environment is determined by the identicalness of the data stored in the memory and the HDD. Accordingly, it is possible to migrate to the independent operation state of the program 172 in the native environment after the reliability of the converted program 172 is confirmed.

Next, a data comparison process in the memory and the HDD will be described in detail.

Figure 17:
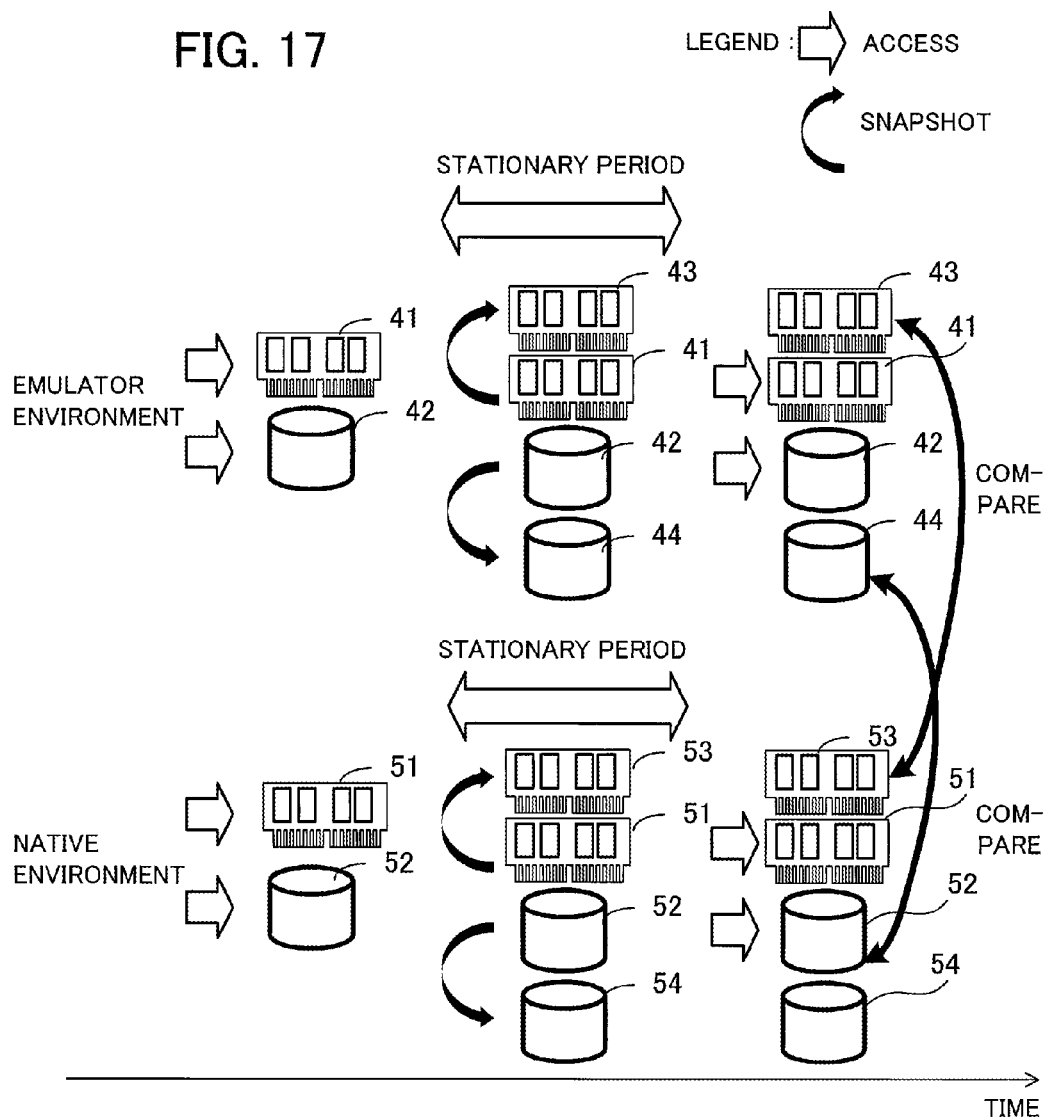
FIG. 17 illustrates an exemplary process of comparing data in a memory and an HDD.

FIG. 17 illustrates an exemplary data comparison process in the memory and the HDD. In FIG. 17, transition of processing in the comparison process along with the progress of time is illustrated.

In the emulator environment, the execution of the program 171 causes accesses to a memory area 41 and an HDD storage area 42 for the emulator environment. In the native environment, on the other hand, the execution of the program 172 causes accesses to a memory area 51 and an HDD storage area 52 for the native environment. Accesses to respective storage areas include write accesses and read accesses. When a write access is performed to a storage area, the content of the storage area is changed.

At a timing of creating a snapshot, a snapshot is created in each of the operational environments. In the emulator environment, for example, a snapshot 43 of data in the memory area 41 is created. In addition, a snapshot 44 of data in the HDD storage area 42 is also created. In the native environment, a snapshot 53 of data in the memory area 51 is created. In addition, a snapshot 54 of data in the HDD storage area 52 is also created. During the snapshot creating period, the progress of the program is stationary.

Upon completion of the snapshot creation, execution of the program is resumed in both the emulator environment and the native environment. Resuming the execution of the program resumes accesses to the memory area 41 and the HDD storage area 42 for the emulator environment, and accesses to the memory area 51 and the HDD storage area 52 for the native environment.

Snapshots are not accessed based on the execution of the program. Therefore, data are compared between the created snapshots. For example, the snapshot 43 of the memory area 41 for the emulator environment is compared with the snapshot 53 of the memory area 51 for the native environment. In addition, the snapshot 44 of the HDD storage area 42 for the emulator environment is compared with the snapshot 54 of the HDD storage area 52 for the native environment. When, as a result of comparison, there is a mismatch in at least one of the data in the memory and the data in the HDD, it is determined that an abnormality has occurred. Upon occurrence of an abnormality, the point of occurrence of the abnormality is stored, together with redoing the code conversion.

When comparing data in the memory and data in the HDD, the processing which has gone ahead is kept waiting in order to align the degrees of progress of respective programs at the time point of comparison.

Figure 18:
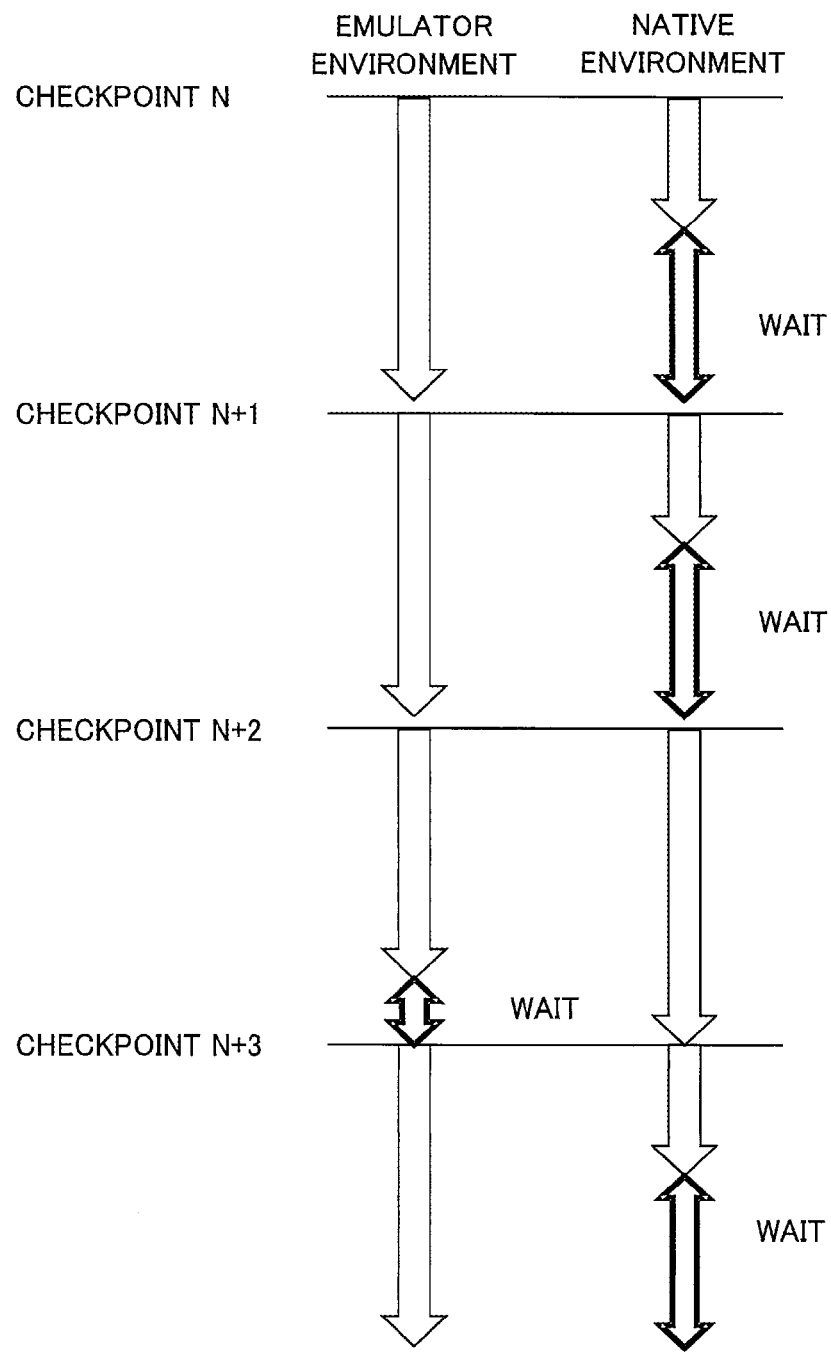
FIG. 18 illustrates an exemplary waiting for comparison.

FIG. 18 illustrates an exemplary waiting for the comparison. The application controller 161 controls the progresses of respective programs to wait at each checkpoint so that no difference arises in the update times of the memory and the disk, for example. In such a case, external inputs/outputs and interruption processes are always set as checkpoints.

In many cases, it is expected that operation in the native environment is faster and terminates earlier owing to lack of overhead due to emulation. In such a case, waiting is performed by temporarily suspending the execution of the program 172 in the native environment at a checkpoint. There may be a case where the processing of the execution of the program 171 in the emulator environment goes ahead, depending on the content of the processing. In such a case, wait is performed by temporarily suspending the execution of the program 171 in the emulator environment.

Figure 19:
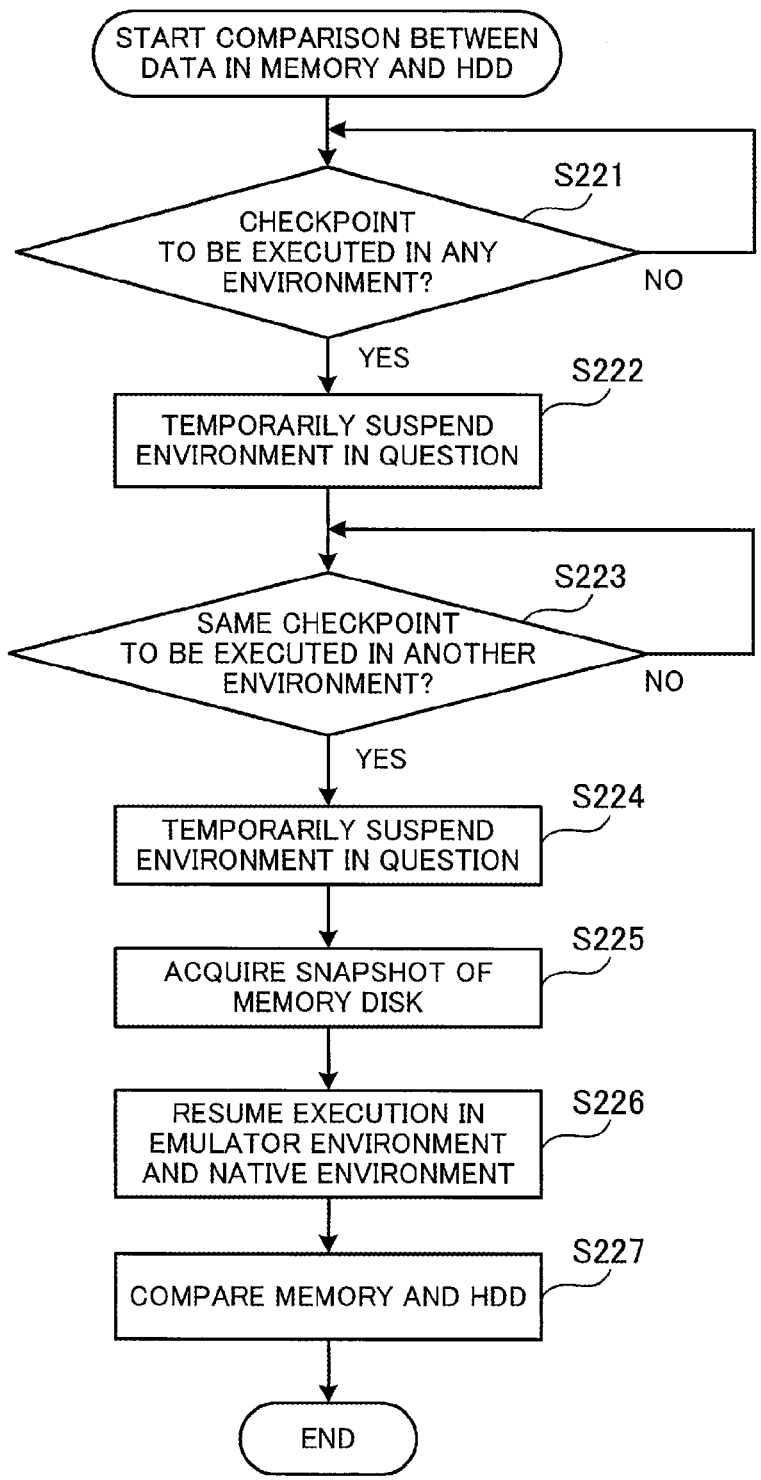
FIG. 19 is a flowchart illustrating a procedure of a data comparison process.

FIG. 19 is a flowchart illustrating the procedure of the data comparison process.

(Step S221) The application controller 161 determines whether or not to perform a process next in which the execution point of a program being executed in either the emulator environment or the native environment has been set as a checkpoint. When the checkpoint is to be executed next, the process flow proceeds to step S222. When the stage of executing the checkpoint has not been reached, the processing at step S221 is repeated.

(Step S222) The application controller 161 temporarily suspends the execution of the program in the environment in which the next execution point of the program has become a checkpoint.

(Step S223) The application controller 161 determines whether or not to execute next the checkpoint at the same program execution point in a different environment from the environment in which the execution point of the program has been set as a checkpoint. When the checkpoint of interest is to be performed next, the process flow proceeds to step S224. When the stage of executing the checkpoint has not been reached, the processing at step S223 is repeated.

(Step S224) The application controller 161 temporarily suspends the execution of the program in the environment in which the next execution point of the program has become the checkpoint.

(Step S225) The application controller 161 acquires, for the emulator environment and the native environment, respectively, a snapshot of the storage area in the memory and the HDD used for the execution of the program.

(Step S226) The application controller 161 resumes the execution of the program in the emulator environment and the native environment.

(Step S227) Using the snapshots, the application controller 161 compares the data stored in the memory and the data stored in the HDD by executing the program in the emulator environment and the native environment.

In this manner, it is possible to compare the data stored in the memory and the HDD due to the execution of the program 171 to be migrated in the emulator environment, and the data stored in the memory and the HDD due to the execution of the converted program 172 in the emulator environment.

In the third embodiment, as has been described above, it is possible to start the execution of the program 171 to be migrated in the computer 100 early, similarly to the second embodiment, and also efficient processing is realized after the migration process is completed. Accordingly, it becomes unnecessary to keep using the emulator 120 after the program migration process is completed, while maintaining the short preparation period for migrating the system environment by using the emulator 120.

In the third embodiment, furthermore, a small amount of resources is sufficient for use in the execution of the migrated program 172 after the program migration process is completed, similarly to the second embodiment.

Figure 20:
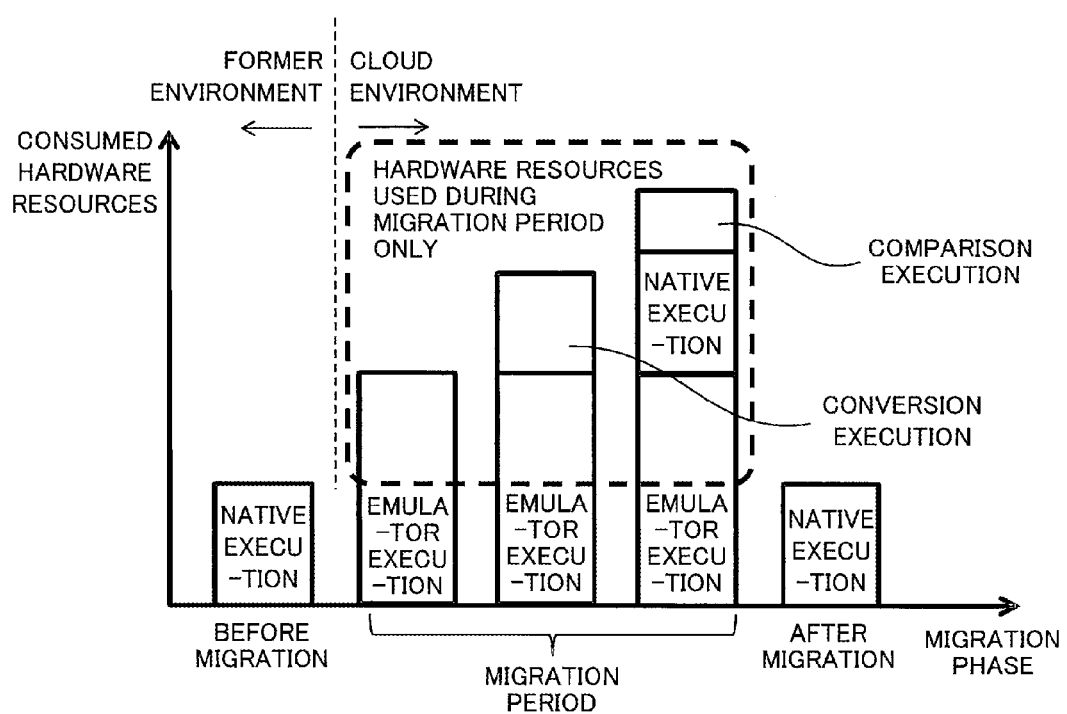
FIG. 20 illustrates an exemplary transition of the amount of hardware resources consumed along with the program migration in the third embodiment.

FIG. 20 illustrates an exemplary transition of the amount of hardware resources consumed along with the program migration in the third embodiment. In FIG. 20, the horizontal axis indicates the migration phase, and the vertical axis indicates the amount of hardware resources consumed, similarly to FIG. 13.

Prior to the program migration process, the program 171 to be migrated is executed in the native environment by a computer having, as the platform, the operational environment of the program 171. Therefore, the amount of consumed hardware resources is small in comparison with the execution via the emulator.

When the migration process by the program 171 is started from the aforementioned state, the program 171 to be migrated is first executed by the emulator 120 in the computer 100 which is the migration destination. In such a case, more resources are consumed in the native environment as much as needed for the emulation process by the emulator 120. Subsequently, the code conversion of the program 171 is started in the computer 100, and still more resources are consumed.

Upon completion of the code conversion process, the converted program 172 is executed in the native environment in parallel with the execution of the program 171 in the emulator environment in the migration destination computer 100. In addition, the comparison process of the data stored in the memory and the HDD is regularly performed. Therefore, still more resources are used.

After the reliability of the converted program 172 is confirmed by the parallel operation of the programs, the execution of the program 171 in the emulator environment is terminated, and also the data comparison process is terminated. As a result, after the program migration process is completed, it is possible to execute the program 172 in the native environment with less consumed resources.

As thus described, it becomes possible to use the resources efficiently by suppressing the amount of consumed resources after the program migration. When the user is charged according to the amount of use of resources in the cloud system, the usage fee of the cloud system is reduced by the suppressing of the amount of consumed resources.

Additionally, in the third embodiment, executing the programs in parallel in both the emulator environment and the native environment for a predetermined period makes it possible to migrate to an operation which uses the converted program 172 after confirming that the converted program 172 normally operates. Accordingly, it is possible to confirm that not only the converted program 172 is executable with no trouble but also the same processing result is acquired as that with the program 171 to be migrated. As a result, it is possible to increase the reliability of the converted program 172.

Furthermore, upon occurrence of a failure after the start of the execution of the converted program 172 in the native environment, code conversion is performed by a different conversion algorithm. Accordingly, it is possible to automatically perform code conversion to a highly reliable program.

Parallel operation of the programs 171 and 172 in in two environments allows communication with other devices and execution of the program in the emulator environment to be continued as-is, even when a failure is detected in the converted program 172 during the parallel operation. Therefore, response to the request from the user will not be delayed even when a failure is detected in the converted program 172.

In addition, although the data stored in the memory 102 and the data stored in the HDD 103 are compared to confirm the normal operation of the converted program 172 in the third embodiment, confirmation of normal operation may be performed by other methods. For example, the content of response to the processing requests which have been input respectively to the emulator environment and the native environment may be compared to confirm the normal operation.

According to an aspect, it becomes possible to allow an early execution start of a program on the migration destination computer, and an efficient execution of the program after the migration process is completed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
   first executing a first program by an emulator which emulates information processing in a first operational environment in which the first program is executable;
   generating, in parallel with the first executing of the first program, a second program which is executable in a second operational environment of the computer and which is capable of acquiring a same processing result as the first program, the second operational environment being provided by the computer and being different from the first operational environment;
   terminating the first executing of the first program and also second executing the second program, after the generating of the second program is completed; and
   terminating the second executing of the second program and third executing the first program by the emulator when a failure in the second executing of the second program is detected.

2. The non-transitory computer-readable storage medium according to claim 1, wherein the generating the second program includes converting a binary code described in the first program into a binary code which is executable in the second operational environment.

3. The non-transitory computer-readable storage medium according to claim 1, wherein the process further includes:
   generating, by a generation algorithm which is different from a generation algorithm used for the generating of the second program, a third program which is executable in the second operational environment and also capable of acquiring the same processing result as the first program when the failure in the second executing of the second program is detected.

4. The non-transitory computer-readable storage medium according to claim 1, wherein the terminating the first executing of the first program and the second executing the second program include starting the second executing of the second program from a code in the second program corresponding to a next code of a last executed code of the terminated first program.

5. The non-transitory computer-readable storage medium according to claim 1, wherein the terminating the first executing of the first program and the second executing the second program include terminating the first program after the first program and the second program are executed in parallel.

6. The non-transitory computer-readable storage medium according to claim 5, wherein the process further includes:
   comparing a result of processing by the first program with a result of processing by the second program while the first program and the second program are executed in parallel and determining, based on a result of the comparing, whether or not the failure in the second executing of the second program is detected.

7. The non-transitory computer-readable storage medium according to claim 5, wherein the terminating the first executing of the first program and the second executing the second program include terminating the first executing of the first program after confirmation that the failure in the second executing of the second program has not been detected for a predetermined period or longer.

8. An information processing system comprising a processor configured to perform a process including:
first executing a first program by an emulator which emulates information processing in a first operational environment in which the first program is executable;
generating, in parallel with the first executing of the first program, a second program which is executable in a second operational environment of the information processing system and which is capable of acquiring a same processing result as a processing result of the first program, the second operational environment being provided by the information processing system and being different from the first operational environment;
terminating the first executing of the first program and also second executing the second program, after the generating of the second program is completed; and
terminating the second executing of the second program and third executing the first program by the emulator when a failure in the second executing of the second program is detected.

9. A program migration method comprising:
first executing a first program by an emulator which runs on a processor included in an information processing system and emulates information processing in a first operational environment in which the first program is executable;
generating, by the processor, in parallel with the first executing of the first program, a second program which is executable in a second operational environment of the information processing system and which is capable of acquiring a same processing result as the first program, the second operational environment being provided by the information processing system and being different from the first operational environment;
terminating, by the processor, the first executing of the first program and also second executing the second program, after the generating of the second program is completed; and
terminating the second executing of the second program and third executing the first program by the emulator when a failure in the second executing of the second program is detected.

* * * * *